US008718294B2

(12) United States Patent
Terlizzi et al.

(10) Patent No.: US 8,718,294 B2
(45) Date of Patent: May 6, 2014

(54) AUDIO CONNECTORS WITH WAVELENGTH-DIVISION-MULTIPLEXING CAPABILITIES

(75) Inventors: Jeffrey J. Terlizzi, San Francisco, CA (US); Victor Tiscareno, Issaquah, WA (US); Jesse L. Dorogusker, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 436 days.

(21) Appl. No.: 12/622,392

(22) Filed: Nov. 19, 2009

(65) Prior Publication Data

US 2011/0116675 A1    May 19, 2011

(51) Int. Cl.
| | |
|---|---|
| H04R 1/10 | (2006.01) |
| H04R 3/00 | (2006.01) |
| H04R 1/02 | (2006.01) |
| H04R 9/06 | (2006.01) |
| H04R 25/00 | (2006.01) |
| H04B 15/00 | (2006.01) |

(52) U.S. Cl.
USPC ........... 381/74; 381/94.1; 381/94.7; 381/122; 381/334; 381/384

(58) Field of Classification Search
USPC ........... 381/66, 74, 334, 94.1, 94.7, 122, 375, 381/384
See application file for complete search history.

(56) References Cited

U.S. PATENT DOCUMENTS

| | | |
|---|---|---|
| 3,995,104 A | 11/1976 | Wasserman |
| 4,552,432 A | 11/1985 | Anderson et al. |
| 4,597,631 A | 7/1986 | Flores |
| 4,767,168 A | 8/1988 | Grandy |
| 4,767,181 A | 8/1988 | McEowen |
| 4,869,566 A | 9/1989 | Juso et al. |
| 4,896,939 A | 1/1990 | O'Brien |
| 4,902,092 A | 2/1990 | Grandy |
| 4,989,935 A * | 2/1991 | Stein .............................. 250/551 |
| 5,280,554 A | 1/1994 | Gleim et al. |
| 5,353,147 A | 10/1994 | Grimes |
| 5,696,861 A | 12/1997 | Schimmeyer et al. |
| 6,044,307 A * | 3/2000 | Kamiya .......................... 700/94 |
| 6,109,797 A | 8/2000 | Nagura et al. |

(Continued)

FOREIGN PATENT DOCUMENTS

| | | |
|---|---|---|
| EP | 1 182 848 A1 | 2/2002 |
| EP | 1 318 576 A1 | 6/2003 |
| EP | 1 257 017 B1 | 7/2004 |
| JP | 2000-315553 A | 11/2000 |

*Primary Examiner* — Vivian Chin
*Assistant Examiner* — Douglas Suthers
(74) *Attorney, Agent, or Firm* — Treyz Law Group; G. Victor Treyz; Kendall P. Woodruff

(57) ABSTRACT

Electronic devices are provided that communicate over cables and other communications paths that include optical and electrical paths. A cable may include wires for forming an electrical path and one or more optical fibers for forming an optical path. Connectors at one or both ends of the cable may include electrical contacts and an optical coupling structure associated with the optical path. Optical paths may be included in connectors such as tip-ring-sleeve connectors and connectors of other types. Interface circuitry may be included in a connector to convert between optical and electrical signaling schemes. Wavelength-division-multiplexing may be used to support bidirectional communications. Breakout boxes and other equipment may be connected using the cables. Digital signals such as digital noise cancellation signals may be conveyed over the optical paths. Power and other electrical signals may be conveyed over the electrical paths.

16 Claims, 17 Drawing Sheets

(56) References Cited

U.S. PATENT DOCUMENTS

| | | | |
|---|---|---|---|
| 6,141,424 A * | 10/2000 | Takiguchi et al. | 381/74 |
| 6,238,249 B1 | 5/2001 | Kuwamura | |
| 6,262,958 B1 | 7/2001 | Ogihara et al. | |
| 6,278,786 B1 | 8/2001 | McIntosh | |
| 6,375,362 B1 | 4/2002 | Heiles et al. | |
| 6,420,964 B1 | 7/2002 | Nishikawa et al. | |
| 6,525,854 B1 | 2/2003 | Takahashi et al. | |
| 6,533,466 B1 | 3/2003 | Smith | |
| 6,558,045 B2 | 5/2003 | Yamaguchi | |
| 6,599,025 B1 | 7/2003 | Deutsch | |
| 6,619,994 B1 | 9/2003 | Chen et al. | |
| 6,880,982 B2 | 4/2005 | Imamura | |
| 6,885,754 B2 * | 4/2005 | Lazzeroni et al. | 381/384 |
| 6,905,255 B2 | 6/2005 | Flanders et al. | |
| 6,947,766 B2 | 9/2005 | Chan et al. | |
| 6,974,239 B2 | 12/2005 | Currie et al. | |
| 7,079,733 B2 * | 7/2006 | Toriumi et al. | 385/101 |
| 7,156,690 B2 | 1/2007 | Tolmie | |
| 7,160,032 B2 | 1/2007 | Nagashima et al. | |
| 7,217,958 B2 | 5/2007 | Aruga et al. | |
| 7,327,919 B1 | 2/2008 | Ko | |
| 7,499,616 B2 | 3/2009 | Aronson et al. | |
| 7,515,797 B2 | 4/2009 | Stark et al. | |
| 7,727,029 B2 | 6/2010 | Bolin et al. | |
| 7,896,708 B2 | 3/2011 | Agevik | |
| 8,021,057 B2 | 9/2011 | Tamura et al. | |
| 8,128,558 B2 | 3/2012 | Amling et al. | |
| 8,272,790 B2 | 9/2012 | Belsan et al. | |
| 2002/0044746 A1 | 4/2002 | Kronlund et al. | |
| 2002/0136510 A1 | 9/2002 | Heinz et al. | |
| 2002/0159716 A1 | 10/2002 | Ohbayashi et al. | |
| 2002/0159725 A1 | 10/2002 | Bucklen | |
| 2002/0177364 A1 | 11/2002 | Mine et al. | |
| 2003/0016920 A1 | 1/2003 | Sohmura et al. | |
| 2003/0235379 A1 | 12/2003 | Lin | |
| 2004/0022543 A1 * | 2/2004 | Hosking et al. | 398/135 |
| 2004/0204081 A1 | 10/2004 | Kim | |
| 2007/0054705 A1 | 3/2007 | Liow et al. | |
| 2007/0177741 A1 * | 8/2007 | Williamson | 381/71.6 |
| 2007/0220560 A1 | 9/2007 | Devine, III | |
| 2007/0269170 A1 | 11/2007 | Easton et al. | |
| 2008/0037941 A1 | 2/2008 | Mallya et al. | |
| 2008/0131058 A1 | 6/2008 | Tsunoda | |
| 2008/0152286 A1 | 6/2008 | Ueno et al. | |
| 2008/0318629 A1 | 12/2008 | Inha et al. | |
| 2009/0110404 A1 | 4/2009 | Agevik | |
| 2009/0175456 A1 | 7/2009 | Johnson | |
| 2009/0180659 A1 | 7/2009 | Sander et al. | |
| 2009/0191914 A1 | 7/2009 | Stahl | |
| 2010/0124845 A1 | 5/2010 | Sabo et al. | |
| 2011/0003550 A1 | 1/2011 | Klinghult et al. | |
| 2011/0123158 A1 | 5/2011 | Little et al. | |

* cited by examiner

AUDIO CONNECTORS WITH WAVELENGTH-DIVISION-MULTIPLEXING CAPABILITIES

BACKGROUND

Electronic devices such as computers, media players, and cellular telephones typically contain audio jacks. Accessories such as headsets have mating plugs. A user who desires to use a headset with an electronic device may connect the headset to the electronic device by inserting the headset plug into the mating audio jack on the electronic device. Miniature size (3.5 mm) phone jacks and plugs are commonly used in electronic devices such as notebook computers and media players, because audio connectors such as these are relatively compact. Because 3.5 mm phone jacks and plugs are sometimes used to carry video signals, 3.5 mm audio connectors such as these are sometimes referred to as audio-video (A/V) connectors.

Headsets and other accessories have speakers that can be used to play back audio for a user. Some accessories have microphones. Microphones can be used to pick up the sound of a user's voice. This allows an electronic device to be used to record voice memos. Electronic devices with cellular telephone circuitry can use a microphone on an accessory to gather the user's voice during a telephone call.

In some headsets, microphones are used to form part of a noise cancellation circuit. When noise cancellation functions are active, the impact of ambient noise on audio playback can be reduced. Microphones can also be used to implement voice microphone noise cancellation.

Noise cancellation operations are generally implemented using analog noise cancellation circuitry. The analog noise cancellation circuitry subtracts a weighted version of the microphone signal from the audio signal.

Although conventional noise cancellation circuit arrangements can be satisfactory in some situations, recent advances in headphone quality and audio playback fidelity are placing increasing burdens on conventional noise cancellation circuits. These burdens are making it difficult or impossible to implement desired levels of noise cancellation performance with conventional approaches.

Conventional audio-video connector arrangements may also make it difficult or impossible to implement desired functionality in a system. For example, conventional 3.5 mm jacks and plugs and associated cables may not exhibit sufficient bandwidth for conveying large amounts of data.

SUMMARY

Electronic devices and external equipment such as headsets and other accessories may handle digital signals. These digital signals may include digital audio and digital video data. Audio-video (A/V) connectors, which are sometimes referred to as tip-ring-ring-sleeve (TRRS) connectors, tip-ring-sleeve (TRS) connectors, or audio connectors, may include electrical and optical components. For example, an audio connector may include electrical contacts that are coupled to electrical transceiver circuitry and an optical path that is coupled to optical transceiver circuitry.

An electronic device may be provided with audio digital signal processing circuitry. Switching circuitry may be configured to ensure that appropriate sets of electrical signal paths are formed. For example, in configurations in which no optical functions are needed, the switching circuitry can be configured to couple electrical data transceiver circuitry or analog circuitry to the electrical contacts in an audio connector. When optical functionality is desired, the switching circuitry can be configured to route power signals over the electrical paths while optical signals are being used to convey potentially large amounts of digital data.

Audio connectors can include conductive contact structures (e.g., tip, ring, and sleeve conductors). These conductors may be separated by insulating structures. For example, a ring of insulator may be located between each of the conductors. Optical functionality can be incorporated into the audio connectors using coaxial optical paths or, when transparent material is used for the insulator that is located between respective conductive contacts in the audio connectors, by conveying light radially through the insulator.

Audio connectors with optical and electrical capabilities may be used in electrical devices and cables and in external equipment such as breakout boxes and other accessories. The optical capabilities of the connectors can be used to convey video data, audio data such as noise cancellation data, or other suitable data.

Further features of the invention, its nature and various advantages will be more apparent from the accompanying drawings and the following detailed description.

DETAILED DESCRIPTION

Figure 1:
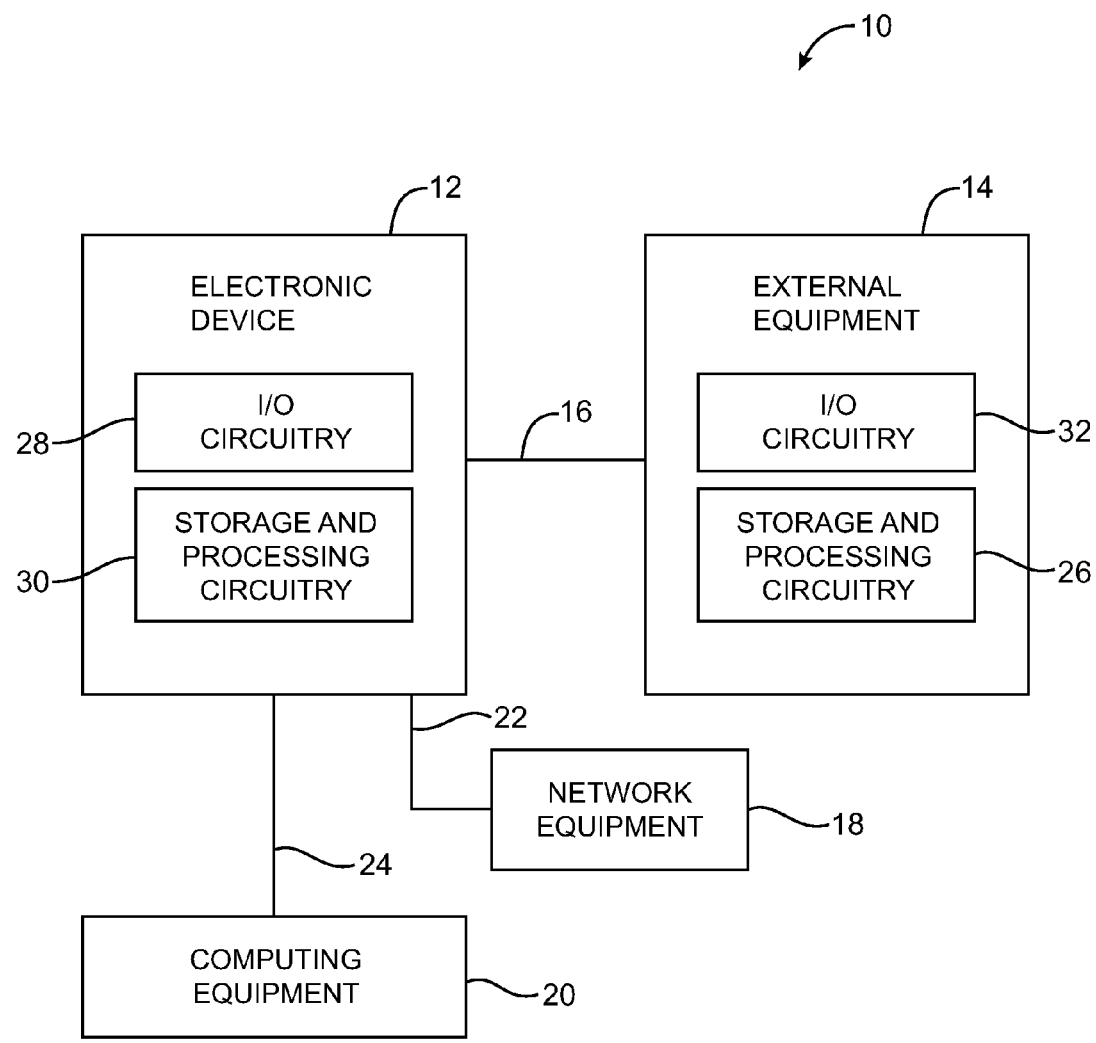
FIG. 1 is a schematic diagram of an illustrative electronic device in communication with an accessory such as a headset, breakout box, or other external equipment in a system in accordance with an embodiment of the present invention.

Electronic components such as electronic devices and other equipment may be interconnected using wired and wireless paths. For example, a wireless path may be used to connect a cellular telephone with a wireless base station. Wired paths may be used to connect electronic devices to equipment such as computer peripherals and audio accessories. As an example, a user may use a wired path to connect a portable music player to a headset.

In a typical wired path, wires are used to handle electrical signals. One or more optical fibers may be included in the same wired path as the wires. For example, a cable may contain four wires and one or two optical fibers (as an example).

With an arrangement of this type, the optical fiber or fibers in the cable may form an optical path and the wires may form an electrical path that runs in parallel with the optical path. The optical and electrical paths may be used to convey digital data such as audio data, video data, control signal data, etc. If desired, power signals and analog signals can be conveyed over the electrical path.

Connectors may be provided in a wired path that contains electrical and optical paths. For example, male and/or female connectors may be provided at one or both ends of a cable or may be used in directly connecting an accessory to an electronic device.

Electronic devices that may be connected to external equipment using optical and electrical paths include desktop computers and portable electronic devices. The portable electronic devices that are connected to the external equipment in this way may include tablet computers, laptop computers, and small portable computers of the type that are sometimes referred to as ultraportables. The portable electronic devices may also include somewhat smaller portable electronic devices such as wrist-watch devices, pendant devices, and other wearable and miniature devices.

The electronic devices that are connected to external equipment may also be handheld electronic devices such as cellular telephones, media players with wireless communications capabilities, handheld computers (also sometimes called personal digital assistants), remote controllers, global positioning system (GPS) devices, and handheld gaming devices. The electronic devices may be devices that combine the functionality of multiple conventional devices. For example, the electronic devices may be cellular telephones that have media player functionality, gaming devices that have wireless communications capabilities, cellular telephones that include game and email functions, and portable devices that receive email, support mobile telephone calls, have music player functionality, and support web browsing. These are merely illustrative examples.

An example of external equipment that may be connected to such an electronic device using optical and electrical paths is an accessory such as a headset. A headset typically includes a pair of speakers that a user can use to play audio from the electronic device. The accessory may have a user control interface such as one or more buttons. When a user supplies input, the input may be conveyed to the electronic device. As an example, when the user presses a button on the accessory, a corresponding signal may be provided to the electronic device to direct the electronic device to take an appropriate action. Because the button is located on the headset rather than on the electronic device, a user may place the electronic device at a remote location such as on a table or in a pocket, while controlling the device using conveniently located headset buttons.

The external equipment that is connected to the electronic device may include equipment such as a tape adapter. A tape adapter may have a plug on one end and a cassette at the other end that slides into a tape deck such as an automobile tape deck. Equipment such as a tape adapter may be used to play music or other audio over the speakers associated with the tape deck. Audio equipment such as the stereo system in a user's home or automobile may also be connected to an electronic device using optical and electrical paths. As an example, a user may connect a music player to an automobile sound system using a three-pin or four-pin audio connector that includes an optical path.

In some situations, it may be desirable to convey relatively large amounts of data between the electronic device and accessory. For example, if the accessory has video playback capabilities (or is coupled to equipment that has video display capabilities), the optical and electrical paths between the electronic device and the accessory may be used to convey relatively large amounts of data (e.g., video data and accompanying soundtrack information, image data, etc.). The data that is conveyed between the electronic device and the accessory may be carried over the optical path and/or the electrical path as digital data.

As another example, the data that is conveyed between the electronic device and the accessory may include audio data. For example, digital audio data from a microphone or digital audio data that is being played back from storage may be conveyed over the optical and/or electrical paths. When an optical path between the electronic device and accessory is available, it may be possible to convey larger amounts of data between the electronic device and accessory than would otherwise be possible. For example, an optical path may be used to convey data at data rates of tens of Mbps or more, hundreds of Mbps or more, or a Gbps or more. Optical paths may also be suitable for incorporation into miniature parts such as 3.5 mm TRS connectors.

In a typical scenario that involves the transmission of audio data, the electronic device that is connected to the external equipment produces audio signals. These audio signals may be transmitted to the external equipment in the form of analog and digital audio. For example, the electrical path may include wires that convey analog audio to speakers in the accessory. The electrical and optical paths may be used to convey digital audio data (e.g., pulse-code-modulation encoded digital audio data).

The external equipment may include a voice microphone. One or more noise cancelling microphones may also be provided. Microphone signals (e.g., analog audio signals corresponding to a user's voice, ambient noise, or other sounds) may be processed locally in the accessory. Microphone signals may also be conveyed to the electronic device using the electrical and/or optical paths.

The communications path between the electronic device and accessory may be used to convey signals such as control signals in addition to audio and video signals. Digital data may be conveyed if desired. In general, data conveyed between the electronic device and accessory may include for example, control signals, audio, video, information to be displayed for a user, etc.

Accessories such as headsets are typically connected to electronic devices using plugs (male connectors) and mating jacks (female connectors). Connectors such as these may be provided in a variety of form factors. Most commonly, these connectors take the form of 3.5 mm (⅛") miniature plugs and jacks. Because audio signals and sometimes video signals are conveyed over 3.5 mm plugs and jacks, 3.5 mm plugs and jacks are sometimes referred to as audio connectors or audio-video (A/V) connectors. The 3.5 mm size is popular for earbuds and other headsets. Other sizes are also sometimes used such as 2.5 mm subminiature connectors and ¼ inch connectors.

In the context of accessories such as headsets, these audio connectors and their associated cables can be used to carry analog signals such as audio signals for speakers and microphone signals. Digital data streams may also be used to convey audio signals (e.g., audio output signals such as played-back media or telephone call audio, microphone signals, and noise cancellation audio), control signals (e.g., input-output signals), clock information, and other signals. Video may be conveyed with or without audio (e.g., as digital data).

Analog signals such as analog audio signals may be conveyed over electrical paths. Power may also be conveyed using electrical paths. Digital data may be conveyed using electrical and/or optical paths. Optical structures such as optical fibers and transparent windows may be incorporated into a communications path between an electronic device and external equipment. These optical structures may be incorporated into audio connectors (e.g., 3.5 mm jacks and plugs) or other connectors (e.g., digital data connectors such Universal Serial Bus connectors, 30-pin connectors, XLR connectors, etc.). For clarity, the use of optical structures in audio connectors such as 3.5 mm jacks and plugs is sometimes described herein as an example.

The audio connectors (audio-video connectors) that are used in connecting an electrical device to external equipment may have any suitable number of electrical terminals. The electrical terminals in a connector are formed from conductive materials such as metal and are typically referred to as contacts. Stereo audio connectors typically have three electrical contacts. The outermost end of an audio plug is typically referred to as the tip. The innermost portion of the plug is typically referred to as the sleeve. A ring contact lies between the tip and the sleeve. When using this terminology, stereo audio connectors such as these are sometimes referred to as tip-ring-sleeve (TRS) connectors. The sleeve can serve as ground. The tip contact can be used in conjunction with the sleeve to handle a left audio channel and the ring contact can be used in conjunction with the sleeve to handle the right channel of audio (as an example). In four-contact audio connectors, an additional ring contact is provided to form a connector of the type that is sometimes referred to as a tip-ring-ring-sleeve (TRRS) connector or simply as a type of TRS connector. Four-contact audio connectors may be used to handle a microphone signal, left and right audio channels, and ground (as an example). If desired, switching circuitry can be used to route different signals to and from the contacts in a connector as needed to implement desired functions. An optical path may be incorporated into an audio connector such as a TRS connector using one or more optical fibers and associated optical structures.

Electrical devices and external equipment may be connected in various ways. For example, a user may connect either a pair of stereo headphones or a headset that contains stereo headphones and a microphone to a cellular telephone audio jack. Accessories such as these may include one or more noise cancelling microphones. For example, the voice microphone may have an associated noise cancellation microphone that picks up ambient noise in the vicinity of the voice microphone. The earbuds or other speakers in an accessory may also have noise cancellation microphones. For example, each earbud in a headset may have an external noise cancellation microphone on an outer surface of the earbud. In addition to the external noise cancellation microphone or instead of the external noise cancellation microphone, each earbud may have an internal noise cancellation microphone on an interior surface of the earbud (adjacent to the ear).

In accessories with more speakers, more noise cancellation microphones may be used. For example, additional noise cancellation microphones can be provided in earbuds that contain multiple drivers or in surround sound accessories. A surround sound accessory might, for example, have five or six speakers (or more) and might have a noise cancellation microphone that is adjacent to each respective speaker.

Electrical devices and external equipment may be operated in various modes. For example, a cellular telephone may be used in a music player mode to play back stereo audio to a user. When operated in telephone mode, the same cellular telephone may be used to play telephone call left and right audio signals to the user while simultaneously processing telephone call microphone signals from the user. Noise cancellation features may be selectively turned on and off as needed. For example, microphone noise cancellation may be activated while earbud noise cancellation features are deactivated (as an example). Noise cancellation functions can also be globally deactivated or globally activated.

Electronic devices and external equipment may be provided with switching circuitry or other path configuration circuitry that allows the electronic devices and external equipment to be operated in a variety of different operating modes in a variety of different combinations. When, for example, a user connects one type of accessory to an electronic device, the switching circuitry may be adjusted to form a first set of electrical paths between the electronic device and accessory. When a user connects a different type of accessory, the path configuration circuitry may be adjusted to form a second set of electrical paths between the electronic device and accessory.

Consider, as an example, the use of an electronic device that has a four-contact TRS jack with integrated optical structures for supporting optical path communications. When a user of device plugs a conventional stereo headset into the electronic device, switching circuitry in the electronic device can be configured to route left and right analog audio output signals to speakers in the headset through the electrical contacts of the TRS jack. When the user plugs a headset that includes noise cancellation microphones into the device, the switching circuitry can be configured to route power to the headset while the optical path is used to convey digital noise cancellation signals between the headset and the device. Another possible scenario involves the use of video equipment. A user may, for example, plug video equipment into the TRS jack. In this situation, the electrical contacts in the jack may be used to convey control signals or power while the optical path is used to convey audio and video data.

Noise cancellation functions may be implemented in the external equipment or in an electronic device. In schemes in which digital audio signals are conveyed from the accessory to the electronic device, the circuit resources of the electronic device may be used to help implement desired functions. This may help reduce the amount of circuitry that is included in a given accessory and may help minimize accessory power consumption. Digital audio processing may also be performed using digital processing circuitry that is primarily or exclusively implemented within an accessory.

In configurations in which at least some of the communications between the electronic device and accessory are implemented using digital communications (optical and/or electrical), the capacity of the electronic device and accessory to communicate can be enhanced. For example, digital communications may allow numerous channels of audio to be conveyed between the electronic device and accessory in real time. Control signals and other signals may also be conveyed digitally. At the same time, the electronic device may, if desired, include analog circuitry that produces analog audio signals. When an accessory with digital communications capabilities is connected to the electronic device, the electronic device and accessory can communicate digitally. When an accessory without digital communications capabilities is connected to the electronic device, analog circuitry in the electronic device may supply analog audio signals to the accessory. For example, if a stereo headset with two speakers and no microphone or control capabilities is connected to the electronic device, analog audio circuitry may be used to supply left and right channels of analog audio to the speakers in the stereo headset. When a more advanced accessory is connected to the electronic device, additional features may become available (e.g., digital audio processing for noise reduction, digital control capabilities, additional audio streams for surround sound speakers, etc.).

An illustrative system in which an electronic device and external equipment may communicate over a wired communications link that includes optical and electrical paths is shown in FIG. 1. As shown in FIG. 1, system 10 may include an electronic device such as electronic device 12 and external equipment 14. External equipment 14 may be equipment such as an automobile with a sound system, consumer electronic equipment such as a television or audio receiver with audio and/or video capabilities, a peer device (e.g., another electronic device such as device 12), a breakout box that serves as an interface between a multiple electronic devices 12, or any other suitable electronic equipment. In a typical scenario, which is sometimes described herein as an example, external equipment 14 may be an accessory that contains speakers such as a headset. External equipment 14 is therefore sometimes referred to as "accessory 14" or "headset 14." Speakers in accessory 14 may be provided as earbuds or as part of a headset or may be provided as a set of stand-alone powered or unpowered speakers (e.g., desktop speakers). As shown in FIG. 1, equipment 14 may include I/O circuitry 32 and storage and processing circuitry 26.

A path such as path 16 may be used to connect electronic device 12 and accessory 14. In a typical arrangement, path 16 includes one or more audio connectors such as 3.5 mm plugs and jacks or audio connectors of other suitable sizes. Conductive lines in path 16 may be used to convey electrical signals over path 16. These lines may be, for example, copper wires covered with plastic insulation. An optical path in path 16 may be used to convey optical signals (i.e., light). The optical path may be formed using one or more optical fibers.

There may, in general, be any suitable number of conductive lines and optical fibers in path 16. For example, there may be two, three, four, five, or more than five separate lines and one, two, or more than two optical fibers. These lines and fibers may be part of one or more cables. Cables may include solid wire, stranded wire, shielding, single ground structures, multi-ground structures, twisted pair structures, or any other suitable electrical cabling structures. The cables may also include plastic fiber, glass fiber, multimode fiber, single mode fiber, and other suitable optical path structures.

Extension cord and adapter arrangements may be used as part of path 16 if desired. In an adapter arrangement, some of the features of accessory 14 such as user interface and communications functions may be provided in the form of an adapter accessory with which an auxiliary accessory such as a headset may be connected to device 12. Adapter functions may also be incorporated into a cable. This type of arrangement may be used, for example, in a cable that has both electrical and optical capabilities at one end, but that has only electrical capabilities at its other end.

Electronic device 12 may be a desktop or portable computer, a portable electronic device such as a handheld electronic device that has wireless capabilities, equipment such as a television or audio receiver, or any other suitable electronic equipment. Electronic device 12 may be provided in the form of stand-alone equipment (e.g., a handheld device that is carried in the pocket of a user) or may be provided as an embedded system. Examples of systems in which device 12 may be embedded include automobiles, boats, airplanes, homes, security systems, media distribution systems for commercial and home applications, display equipment (e.g., computer monitors and televisions), etc.

Device 12 may include input-output circuitry 28 and storage and processing circuitry 30. Input-output circuitry 28 of device 12 and input-output circuitry 32 of equipment 14 may include buttons, touch-sensitive components such as touch screens and touch pads, microphones, sensors, and other components for gathering input from a user. Input-output circuitry 32 and 28 may also include speakers, status inductors such as light-emitting diodes, displays, and other components for providing output to users. Circuitry 32 and 28 may also include digital and analog communications circuitry for supporting electrical and optical communications over path 16 and for supporting wireless communications. Storage and processing circuitry 26 and 30 may be based on microprocessors, application-specific integrated circuits, audio chips (codecs), video integrated circuits, microcontrollers, digital signal processors, memory devices such as solid state storage, volatile memory, and hard disk drives, etc.

Device 12 may communicate with network equipment such as equipment 18 over path 22. Path 22 may be, for example, a cellular telephone wireless path. Equipment 18 may be, for example, a cellular telephone network. Device 12 and network equipment 18 may communicate over path 22 when it is desired to connect device 12 to a cellular telephone network (e.g., to handle voice telephone calls to transfer data over cellular telephone links, etc.).

Device 12 may also communicate with equipment such as computing equipment 20 over path 24. Path 24 may be a wired (electrical and/or optical) or wireless path. Computing equipment 20 may be a computer, a set-top box, audio-visual equipment such as a receiver or television, a disc player or other media player, a game console, a network extender box, or any other suitable equipment.

In a typical scenario, device 12 may be, as an example, a handheld device that has media player and cellular telephone capabilities (sometimes referred to collectively as a cellular telephone). Accessory 14 may be a headset with a microphone and a user input interface such as a button-based interface for gathering user input. Path 16 may be a four or five conductor audio cable with an embedded optical path that is connected to devices 12 and 14 using 3.5 mm audio jacks and plugs (as an example). Computing equipment 20 may be a computer with which device 12 communicates (e.g., to synchronize a list of contacts, media files, etc.).

Paths such as path 24 and 16 may be based on commonly available digital connectors such as USB or IEEE 1394 connectors, XLR connectors, audio connectors, etc. These connectors may include electrical and optical paths. An advantage of using communications paths that are compatible with commonly-used audio connectors such as the 3.5 mm audio connectors is that this type of arrangement may maintain compatibility with a user's existing collection of headsets and other legacy equipment. Arrangements in which the communications paths of system 10 are implemented using audio connectors with a 3.5 mm form factor or other arrangement that is compatible with conventional audio connectors are therefore sometimes described herein as an example. This is merely illustrative. In general, the communications paths and connectors that are used in system 10 may include electrical and optical paths and coupling structures of any suitable type.

In system 10, electronic device 12 and accessory 14 may include switching circuitry (also sometimes referred to as adjustable path configuration circuitry) that can be used to selectively interconnect various circuits to the contacts in the audio connectors of path 16. The switching circuitry may be adjusted to support different modes of operation. These different modes of operation may result from different combinations of accessories and electronic devices, scenarios in which different device applications are active, etc. The switching circuitry may be formed from one or more transistor-based switches. If desired, the switching circuitry may include hybrid circuits that can be selectively switched into use. When the hybrid circuits are not actively used, the electrical communications path and associated connector contacts to which they are connected may be used for unidirectional communications. When the hybrid circuits are switched into active use, the same electrical communications path and connector contacts may be used to support bidirectional signals (e.g., an outgoing left or right audio channel in one direction and an incoming microphone signal in the opposite direction). Bidirectionality may also be supported using time multiplexing protocols.

Figure 2:
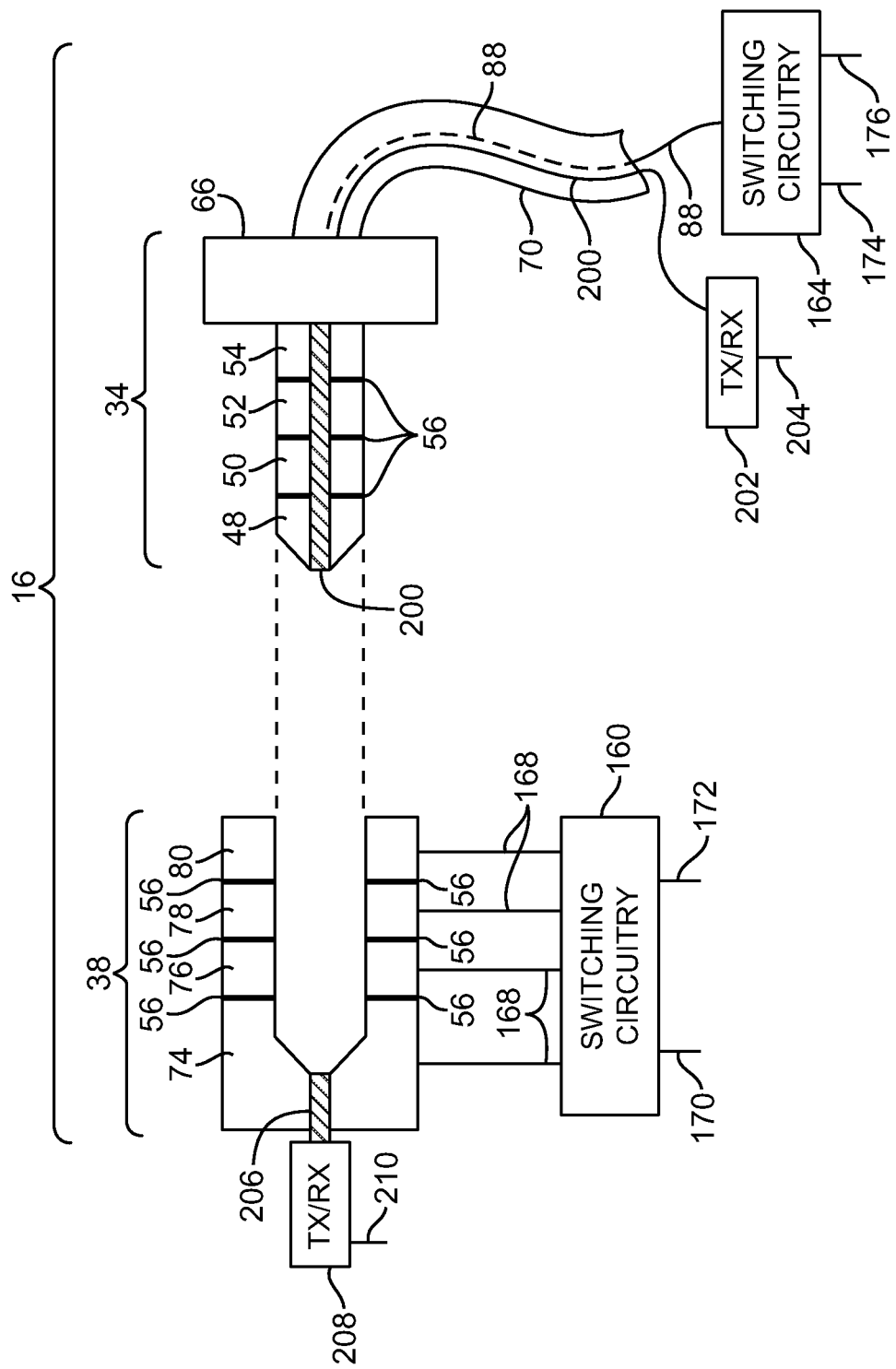
FIG. 2 is a diagram showing how a communications path that includes a tip-ring-sleeve connector can be used to allow equipment to interact in accordance with an embodiment of the present invention.

Illustrative circuitry that may be associated with path 16 is shown in FIG. 2. Switching circuitry 160 may be provided in electronic device 12 and switching circuitry 162 may be provided in accessory 14 or other external equipment. Wired path 16 may be used to connect electronic device 12 and accessory 14. Path 16 may include audio connectors such as audio connectors 34 and 38.

The audio connectors of path 16 may include an audio plug such as plug 34 (i.e., a male audio connector). Plug 34 may have a prong-shaped member that allows plug 34 to mate with a corresponding audio jack such as audio jack (i.e., a female audio connector). Jack 38 may include electrical contacts that surround a cylindrical opening that receives plug 34. These contacts may be formed from rings of metal, spring-loaded conductive structures, etc. Connectors 34 and 38 may be used at any suitable location or locations within path 16. For example, audio jacks such as jack 38 can be formed within the housing of device 12 and plugs such as plug 34 can be formed on the end of a cable such as cable 70 that is associated with a headset or other accessory 14. As shown in FIG. 2, cable 70 may be connected to audio plug 34 via strain-relief plug structure 66. Structures such as structure 66 may be formed with an external insulator such as plastic (as an example).

Audio plug 34 is an example of a four-contact plug. A four-contact plug has four conductive regions that mate with four corresponding conductive regions in a four-contact jack such as jack 38. As shown in FIG. 2, these regions may include a tip region such as region 48, ring regions such as rings 50 and 52, and a sleeve region such as region 54. These regions surround the cylindrical surface of plug 34 and are separated by insulating regions 56. When plug 34 is inserted in mating jack 38, tip region 48 may make electrical contact with jack tip contact 74, rings 50 and 52 may mate with respective ring regions 76 and 78, and sleeve 54 may make contact with sleeve terminal 80. Insulating regions 56 may separate the contacts in jack 38. In a typical configuration, there are four wires 88 in cable 70, each of which is electrically connected to a respective contact in plug 34.

Cable 70 may also include optical path 200. Optical path 200 may be formed from one or more optical fibers. In the example of FIG. 2, path 200 is formed from a single optical fiber. As shown in FIG. 2, path 200 extends through the central core of plug 34 and mates with a corresponding optical path 206 in jack 38. Path 206 may be located in electronic device 12 (FIG. 1) and may be used to convey optical signals between optical transceiver 208 in device 12 and optical path 200. In this capacity, path 206 may be considered to form a part of path 200.

Transceiver 202 may be located in accessory 14. During optical communications between device 12 and accessory 14, optical transceivers 208 and 202 may communicate optically over path 200.

Switching circuitry 160 may receive analog signals via path 170. For example, switching circuitry 160 may receive analog audio output signals on path 170 and may switch these signals onto lines 168 when operating in an analog output mode to support legacy analog accessories. Path 170 may also be used to route power supply signals to appropriate contacts in jack 38. Switching circuitry 160 may handle digital electrical signals using path 172. For example, when operating in a digital audio mode to support a digital-ready headset, switching circuitry 160 may switch digital audio streams that are received on path 172 onto lines 168.

In electronic device 12, signals (e.g., digital signals) that are conveyed over path 200 optically can be handled using input-output path 210. During data transmission operations from device 12, data from processing circuitry within electronic device 12 may be provided to path 210. Data that is received at path 210 may be converted into optical signals using transceiver 208 and may be routed to path 200 via path 206. In accessory 14, optical signals from path 200 may be received by transceiver 202. Transceiver 202 may convert received optical signals to electrical signals that are provided on input-output path 204. Processing circuitry within the accessory may receive and process the signals on path 204.

Accessory 14 can transmit optical data using transceiver 202. Processing circuitry within accessory 14 can provide data to input-output path 204. Transceiver 202 may convert the electrical signals that are received at path 204 to optical signals. The optical signals can be transmitted to electronic device 12 using path 200. In device 12, optical signals from path 200 may be conveyed to transceiver 208 via path 206. Transceiver 208 may convert received optical signals to electrical signals that are provided at path 210.

Transceivers 208 and 202 may include light sources and detectors. For example, each transceiver may include one or more light emitting diodes, one or more laser diodes, or other sources of light. These sources may operate at a single wavelength or wavelength division multiplexing arrangements can be supported using multiple wavelengths of light. Each transceiver may also include photodetectors such as p-i-n diodes, p-n junction diodes, photodiode arrays, etc.

Accessories may have fixed operating modes or adjustable operating modes. For example, a legacy analog headset may only operate in an analog audio mode. As another example, a digital-capable headset may operate in both analog and digital modes. This type of multimode operation may allow a digital-capable headset to revert to an analog audio mode when used with a legacy music player. To accommodate multiple operating modes, accessory 14 may control the configuration of the switches in switching circuitry 164. When operating in analog audio mode, analog signals that are being conveyed between device 12 and accessory 14 can be routed through analog lines 174. When operating in digital audio mode, switching circuitry 164 can be configured to switch digital path 176 into use and/or to use transceiver 202 to handle digital optical signals. These configurations need not be mutually exclusive. For example, switching circuitry 160 and 164 may, if desired, be placed into configurations in which a mixture of analog and digital signals are conveyed over path 16 while optical signals are being conveyed over path 200. A typical mixture of signals over path 16 might include power signals, optical and/or electrical control signals, optical and/or electrical audio signals, and optical and/or electrical video signals. Switching circuitry 164 may, if desired, be used to switch an ultrasonic tone generation circuit into use (e.g., to send electrical ultrasonic tone codes from accessory 14 to device 12 that correspond to button press events or other user input).

The signal assignments that are used in the audio connectors of path 16 depend on the type of electronic device and accessory being used and the active operating mode for the system. For example, when operating in a legacy analog mode, ring contact 52 may serve as ground (and may therefore sometimes be referred to as the G contact of plug 34), tip 48 may be associated with left channel audio (and may therefore sometimes be referred to as the L contact of plug 34), ring 50 may be associated with right channel audio (and may therefore sometimes be referred to as the R contact of plug 34), and sleeve 54 may be associated with microphone signals (and may therefore sometimes be referred to as the M contact of plug 34). The mating contacts of jack 38 may have corresponding signal assignments.

Figure 3:
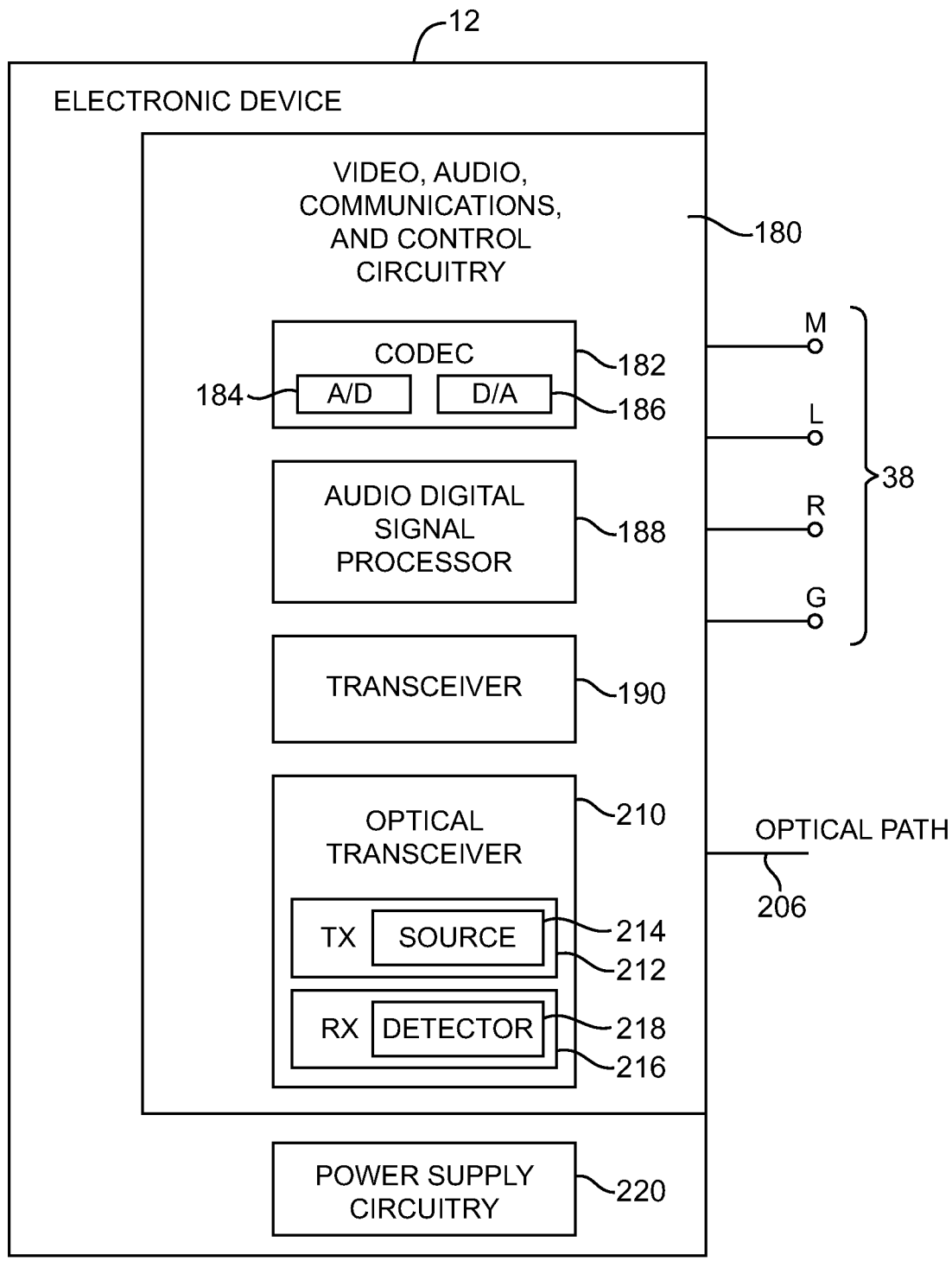
FIG. 3 is a schematic diagram showing illustrative circuitry that may be used in an electronic device to electrically and optically communicate with an accessory and to provide processing and power supply functions in accordance with an embodiment of the present invention.

As shown in FIG. 3, electronic device 12 may contain video, audio, communications, and control circuitry 180. Video circuitry in circuit 180 may be used to generate video signals or to receive and process video signals. Audio circuit 182, which is sometimes referred to as a codec or audio codec, may be used to generate audio signals or to receive and process audio signals. Audio circuit 182 may include analog-to-digital (A/D) converter circuitry 184 and digital-to-analog (D/A) converter circuitry 186. Analog-to-digital converter circuitry in device 12 may be used to digitize analog signals such as analog audio signals. For example, analog-to-digital converter circuitry 184 may be used to digitize one or more analog microphone signals. These microphone signals may be received from accessory 14 over path 16 or may be received from microphone equipment in device 12. Digital-to-analog converter circuitry 186 may be used to generate analog output signals. For example, digital-to-analog converter circuitry 186 may receive digital signals corresponding to the audio portion of a media playback event, audio for a telephone call, noise cancellation signals, an alert tone or signal (e.g., a beep or ring), or any other digital information. Based on this digital information, digital-to-analog converter circuitry 186 may produce corresponding analog signals (e.g., analog audio).

Audio digital signal processor 188 may be used to perform digital signal processing on digitized audio signals. For example, if operating accessory 14 in a voice microphone noise cancellation mode, digital noise cancellation signals from a voice microphone noise cancellation microphone in accessory 14 may be conveyed over path 16 to audio digital signal processor 188. Audio digital signal processor 188 may also receive digital audio voice signals from the voice microphone in accessory 14 and digital noise cancellation signals from speaker noise cancellation microphones. Using the processing capabilities of audio digital signal processor 188, the digital noise cancellation microphone signals from accessory 14 can be digitally removed from the digital audio voice signal and from digital speaker signals. Use of the processing power of device 12 in this way may help to reduce the processing burden that is placed on accessory 14. This may allow accessory 14 to be constructed from less costly and less complex circuitry. Power consumption efficiency and audio performance may also be enhanced. If desired, digital audio processing circuitry in accessory 14 can be used to supplement or replace the audio processing functions of audio digital signal processor 188. For example, digital noise cancellation circuitry in accessory 14 may be used in cancelling noise for the speakers of accessory 14.

Electrical transceiver 190 may be used to support unidirectional or bidirectional electrical digital communications with a corresponding electrical transceiver in accessory 14 over path 16. Optical transceiver 210 may be used to support unidirectional or bidirectional optical digital communications with a corresponding optical transceiver in accessory 14 over path 16. Optical transceiver 210 may have an optical transmitter 212 and an optical receiver 216. Transmitter 212 may include a light source such as light source 214. Light source 214 may be a light-emitting diode (LED), a laser diode, or any other suitable source of light. The light is produced by light source 214 may be visible light, infrared light, or may have other suitable wavelengths. Detector 218 may be used by receiver 216 to convert incoming light signals from optical path 206 (which is an extension of path 200 of path 16)

to electrical signals. During optical data transmissions, light from source 214 may be conveyed to optical path 200 of path 16 using optical path 206.

Any suitable communications protocol may be used by transceivers 190 and 210. For example, a protocol may be used that includes functions such as error correction functions. Data may be sent in packets or other suitable data structures. A clock that is produced by circuitry 180 of FIG. 3 (e.g., by circuitry in transceiver 190) may be transmitted with the data. For example, transceiver 190 and/or transceiver 210 may embed a variable clock in a transmitted digital data stream.

Power supply circuitry 220 may be used in providing power to the electrical contacts in connector 38 (e.g., from a battery in device 12).

Switching circuitry such as switching circuitry 160 of FIG. 2 may be used to selectively connect the contacts of audio connector 38 to the circuits of video, audio, communications, and control circuitry 180, power supply circuitry 220, and other circuitry in device 12. For example, when it is desired to supply analog audio output signals from codec 182 to connector 38, the switching circuitry can be adjusted accordingly by the control and processing circuitry of device 12. When it is desired to route electrical digital signals to the audio contacts of audio connector 38, the switching circuitry can be used to connect transceiver 190 to audio connector 38. Power signals and other signals can also be selectively routed to connector 38 by switching circuitry 160. Optical path 206 and associated optical path 200 of FIG. 2 may be used in conveying optical signals to and from device 12.

Figure 4:
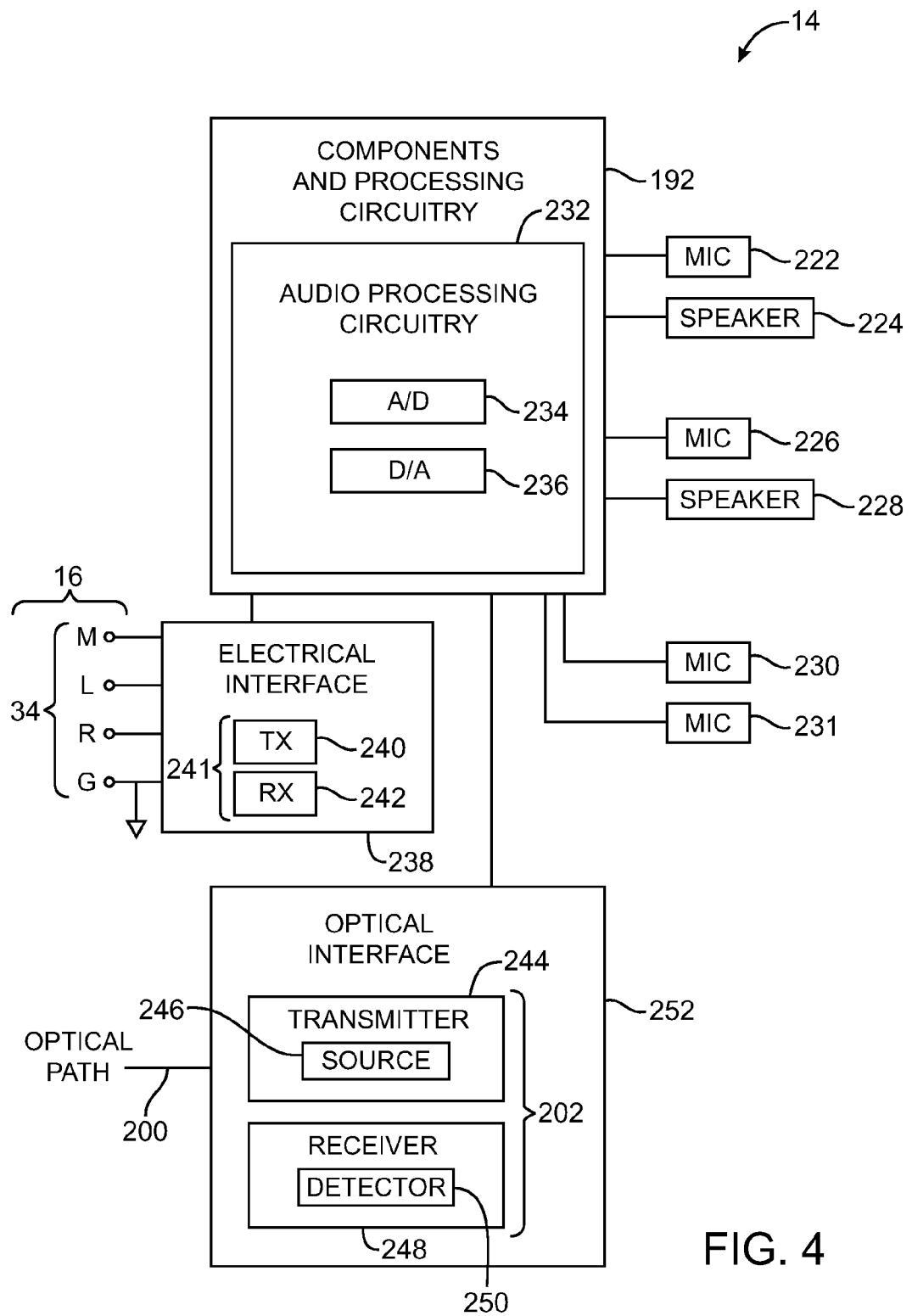
FIG. 4 is a circuit diagram of illustrative circuitry in an accessory that performs processing functions and that electrically and optically communicates with circuitry in an electronic device such as the circuitry of FIG. 3 in accordance with an embodiment of the present invention.

Illustrative circuitry that may be used to handle signal processing tasks for accessory 14 is shown in FIG. 4. As shown in FIG. 4, accessory 14 may include components and processing circuitry 192. Circuitry 192 may include components such as a battery, switches, a display, a touch screen, a keyboard, integrated circuits, discrete components, etc. Circuitry 192 may also include components such as microphones and speakers. In the example of FIG. 4, accessory 14 includes microphones 222, 226, 230, and 231 and includes speakers 224 and 228 (shown separately in the FIG.). Speakers 224 and 228 may be, for example, left and right speakers in a pair of earbuds or left and right speakers in other external equipment. Microphones 222 and 226 may be noise cancellation microphones that are used to gather ambient noise signals associated with speakers 224 and 228, respectively. Using noise cancellation techniques, the ambient noise signals can be used to reduce noise in the audio being played through speakers 224 and 228. Noise cancellation techniques can also be implemented for microphones. For example, microphone 230 may be a voice microphone that is used to gather the user's voice during telephone calls or that is used to record audio clips. Microphone 231 may be used to gather ambient noise signals associated with the use of microphone 230 and may therefore serve as a noise cancellation microphone for microphone 230.

Noise cancellation operations may be performed using analog circuitry or using digital processing techniques. Digital audio processing operations for implementing noise cancellation and for implementing other functions can be performed locally in accessory 14 or can be performed remotely in device 12. As shown in FIG. 4, circuitry 192 may include audio processing circuitry 232. Circuitry 232 may include analog-to-digital converter circuitry 234 (e.g., for digitizing analog audio signals from the microphone in accessory 14) and digital-to-analog converter circuitry 236 (e.g., to convert digital signals to analog signals that are played back through the speakers of accessory 14).

As described in connection with FIG. 2, accessory 14 may communicate with device 12 over path 16. Path 16 may include wires that are connected to respective electrical contacts in connector 34 and thereby electrical interface 238. Path 16 may also include an optical path (shown as path 200) that is connected to optical interface 252. Electrical interface 238 may include switching circuitry (e.g., switching circuitry 164 of FIG. 2) and electrical transceiver circuitry 241 such as transmitter 240 and receiver 242. Transmitter 240 and receiver 242 may be used to support electrical communications with corresponding receiver and transmitter circuits in electrical transceiver 190 (FIG. 3). Switching circuitry 164 (FIG. 2) may be used to adjust the electrical paths in accessory 14 to support a desired mode of operation. In particular, circuitry 164 of FIG. 2 may be used to connect microphone contact M, left and right channel contacts L and R, and ground contact G to appropriate circuits in accessory 14 while switching circuitry 160 in device 12 is used to connect the corresponding contacts in connector 38 to appropriate circuits in device 12.

Optical communications over path 16 may be supported using optical transceiver 202 of optical communications interface circuitry 252. Transmitter 244 may contain an optical source such as source 246. Source 246 may contain one or more laser diodes, light-emitting diodes, etc. Receiver 248 may include a detector such as detector circuitry 250. Detector 250 may include one or more photodetectors for receiving light signals that have been transmitted over optical path 200 from device 12.

Circuitry 192 may use electrical interface 238 to support electrical communications with device 12 over path 16. Circuitry 192 may use optical interface 252 to support optical communications with device 12 over path 16.

Circuitry 232 may be used to locally implement noise cancellation functions. In a typical local noise cancellation arrangement using digital processing techniques, analog microphone signals are digitized using analog-to-digital circuitry 234. Processing circuitry 232 receives audio signals (e.g., played back music) from device 12 over path 16 in digital form (optical or electrical). Audio processing circuitry 232 may then use digital processing techniques to cancel noise from the played back audio. The resulting audio signal may be converted to analog for speakers 224 and 228 using digital-to-analog converter circuitry 236.

In a typical remote noise cancellation technique, circuitry, analog-to-digital converter circuitry 234 may be used to digitize ambient noise signals from noise cancellation microphones in accessory 14 such as microphone 222, microphone 226, and microphone 231. Electrical interface 238 and/or optical interface 252 may be used to transmit these signals to accessory 14. An advantage of using optical path 200 to convey digital audio signals from accessory 14 to device 12 is that optical path 200 is generally not subject to electrical interference and may be able to support signals with relatively large data rates. Device 12 may receive the digital noise cancellation signals from the noise cancellation microphone using transceiver 190 and/or transceiver 210 (FIG. 3). Audio digital signal processor 188 may then be used to perform noise cancellation operations. The resulting noise-cancelled audio signal can be returned to accessory 14 over path 14 (e.g., using analog output from codec 182, electrical digital signals from transceiver 190, or optical digital signals from transceiver 210). In accessory 14, analog signals may be routed to speakers 224 and 228. If the noise-cancelled audio is provided in digital form, electrical interface 238 and/or optical interface 252 can provide these signals to circuitry 232. Digital-to-analog converter circuitry 236 may then convert the digital audio to analog audio to play back on speakers 224 and 228.

If desired, other features may be implemented locally and/or remotely. For example, accessory 14 may use circuitry 192 to locally process user input data such as button actuation data, video, images, or sensor data. These signals may also be processed remotely by conveying local signals to device 12 over path 16 using electrical interface 238 and/or optical interface 252. The use of audio processing circuitry 232 to implement local and remote processing operations is merely illustrative.

If desired, device 12 may be coupled to external equipment that serves as an interface between multiple devices. This type of arrangement is shown in FIG. 5.

Figure 5:
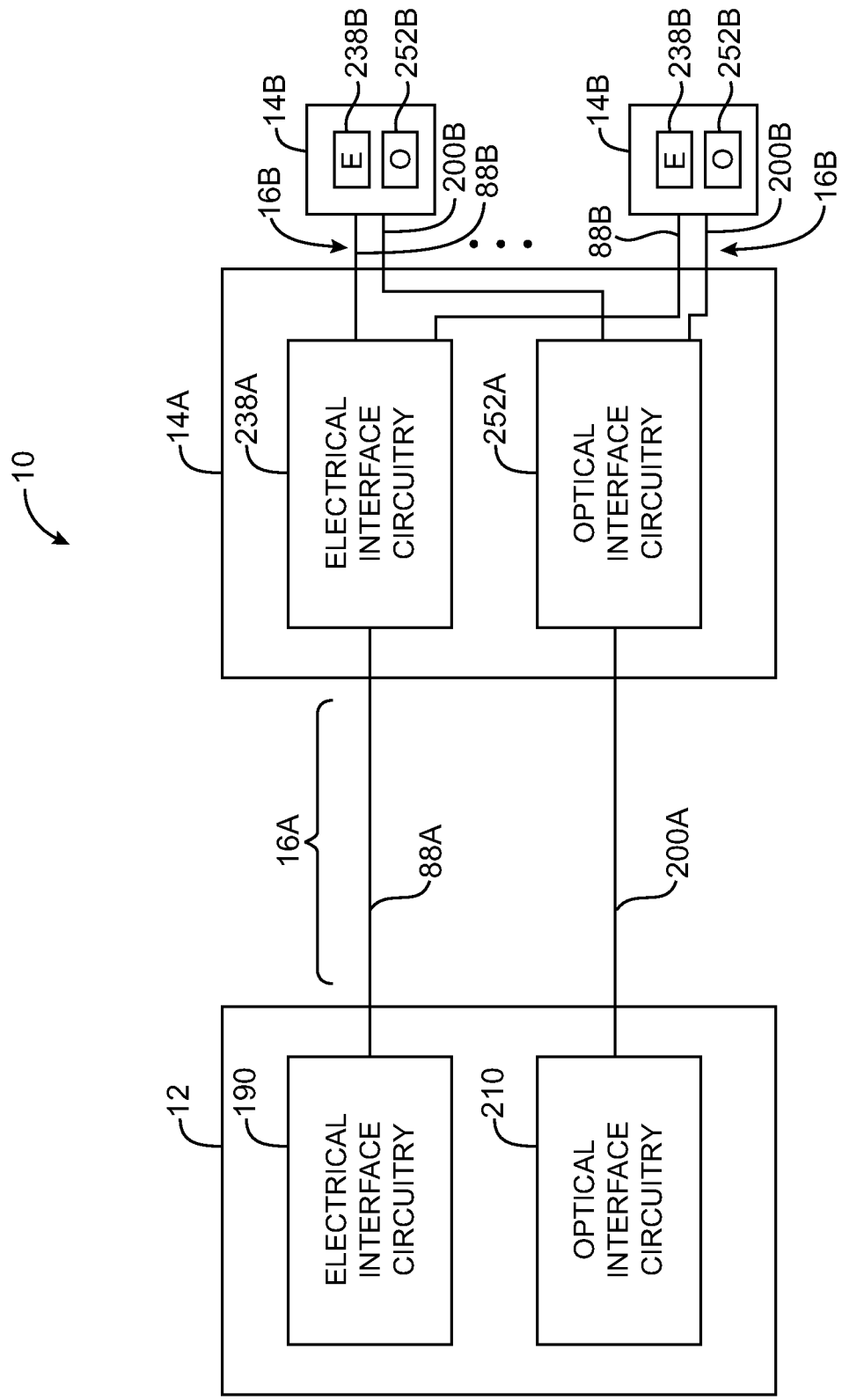
FIG. 5 is a diagram of an illustrative system in which electronic equipment such as a breakout box serves as an interface between an electronic device and other equipment in accordance with an embodiment of the present invention.

As shown in FIG. 5, system 10 includes electronic device 12. Electronic device 12 includes electrical interface circuitry (transceiver) 190 and optical interface circuitry (transceiver) 210. Path 16A may include electrical path 88A and optical path 200A. Path 16A may be used to connect electronic device 12 to electronic equipment 14A. Equipment 14A may use electrical interface circuitry 238A (electrical transceiver circuitry) to communicate with device 12 over electrical path 88A. Equipment 14A may use optical interface circuitry 252A (optical transceiver circuitry) to communicate with device 12 over optical path 200A.

Equipment 14A may serve as an interface (sometimes referred to as a breakout box) between device 12 and one or more additional pieces of equipment 14B. The devices that are interconnected in system 10 of FIG. 5 can be, for example, consumer electronics devices such as receivers, set-top boxes, and televisions. The interconnected devices may also include computers, audio equipment (e.g., musical instruments, studio monitors, sound effects boxes, etc.), video equipment (e.g., displays, video processors, etc.), printers and other peripherals, communications equipment, etc.

As shown in FIG. 5, equipment 14A may use electrical interface circuitry 238A to communicate with corresponding electrical interface circuitry 238B (transceiver circuitry) in one or more pieces of equipment 14B using electrical paths 88B in paths 16B. This allows power and/or electrical data signals to be distributed to equipment 14B using equipment 14A. The power and/or data signals may originate in device 12 or may originate in equipment 14B. Equipment 14A may also use optical interface circuitry 252A to communicate with corresponding optical interface circuitry 252B (transceiver circuitry) in one or more pieces of equipment 14B using optical paths 200B in paths 16B. This allows optical signals from device 12 or one of devices 14B to be distributed to other equipment in system 10.

Consider, as an example, the use of equipment 14B as an audio breakout box. In this type of arrangement, equipment (device) 12 may be a computer with one or more audio and video cards. These cards may be coupled to equipment 14A using path 16A. Equipment 14B may include musical instrument equipment such as guitars, synthesizers, studio monitors, voice microphone, instrument microphones, etc. In equipment 14B, optical interface circuitry 252B may be used to carry digital optical data such as digital audio data. For example, in a synthesizer, the optical path between the synthesizer and breakout box 14A may be used to carry musical instrument digital interface (MIDI) data and/or digital audio. In a guitar, the optical path between the guitar and breakout box 14A may be used to carry digital audio data from pickups or on-board effects circuitry in the guitar. Microphones and studio monitors may use the optical paths to carry digital audio data.

To support legacy cables and to enhance compatibility with equipment that does not necessarily contain optical paths, the hybrid optical-electrical connectors that are used in system 10 may use a variety of form factors. For example, the connectors on one or both ends of the cables in paths 16A and 16B may be USB connectors, audio connectors such as 3.5 mm jacks and plugs or quarter-inch jacks and plugs, male and female XLR connectors, other connectors, or combinations of these connectors. A cable may have, as an example, a hybrid electrical-optical connector on one end and a larger or smaller audio connector or other connector on the other end. The hybrid connector in this type of arrangement may be based on a USB form factor, an XLR form factor, an audio connector form factor (e.g., 3.5 mm or quarter inch, etc.), a connector that is based on an XLR-¼" audio connector hybrid, etc. The connector on the other end may have conventional electrical capabilities and may be based on a USB form factor, an XLR form factor, an audio connector form factor (e.g., 3.5 mm or quarter inch, etc.), a connector that is based on an XLR-¼" audio connector hybrid, etc. Circuitry in the cable or elsewhere in the system may be used to convert between optical and electrical signaling formats. The electrical paths in the cables may be balanced or unbalanced. Each piece of equipment in system 10 may have mating connectors that receive the connectors at the ends of the cables.

Figure 6:
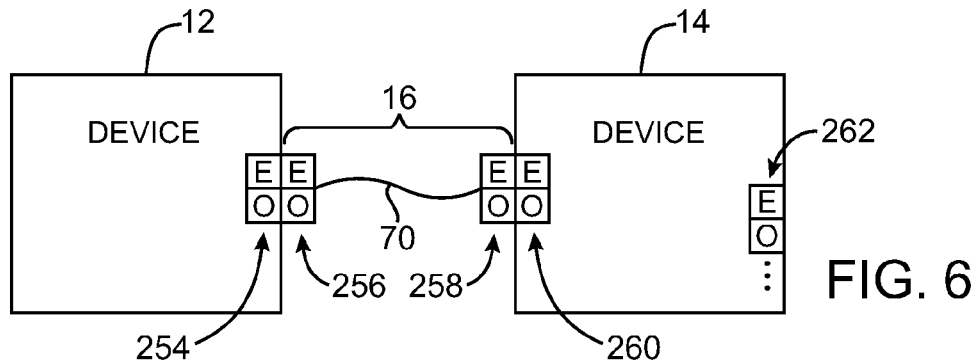
FIG. 6 is a diagram showing how an electronic device may communicate with external equipment using a cable having connectors with optical and electrical components in accordance with an embodiment of the present invention.

As shown in FIG. 6, path 16 may be provided with hybrid optical-electrical connectors at both ends. Device 12 may have a connector such as connector 254 that contains both electrical ("E") and optical ("O") interfaces (transceivers). Cable 70 may have a pair of optical-electrical connectors. Optical-electrical connector 256 may have an optical path and electrical contacts that mate with a corresponding optical path and electrical contacts in connector 254 of device 12. Optical-electrical connector 258 may mate with optical-electrical connector 260 in device 14. Devices 12 and 14 may be cellular telephones or other electrical devices, accessories such as headphones or other electrical equipment, etc. Device 14 may have optional additional connectors such as optical-electrical connector 262 for interfacing with additional components (e.g., as described in connection with FIG. 5). Device 12 may also have more than one optical-electrical connector if desired.

Figure 7:
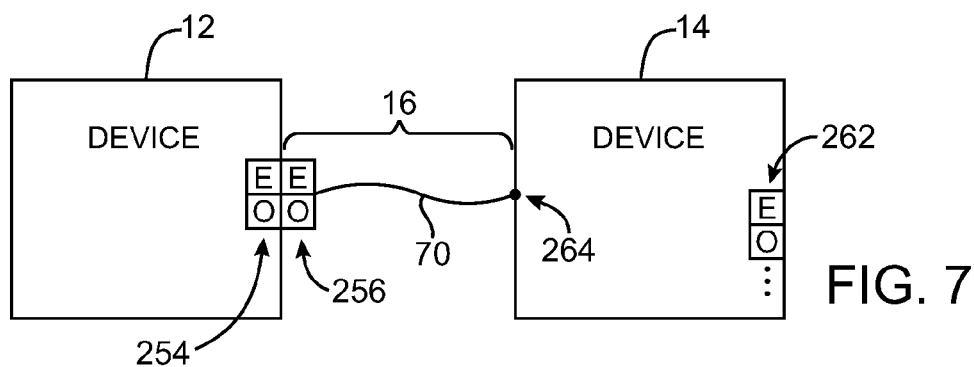
FIG. 7 is a diagram showing how an electronic device may communicate with external equipment using a cable with a connector at one end that has optical and electrical components in accordance with an embodiment of the present invention.

An arrangement of the type shown in FIG. 6 may be satisfactory when it is desired to interconnect pieces of equipment that each contain a connector for receiving a mating cable connector. In some situations, it may be desirable to use a hardwired cable connection in place of or in combination with a connector-type arrangement. For example, a headset may have a cable pigtail that has a connector. In this situation, the cable in path 16 may have one end that has a connector and one end that is connected directly to circuitry in a device without using a connector. A configuration of this type is shown in FIG. 7. As shown in FIG. 7, device 12 may have an optical-electrical connector 254. Cable 70 in path 16 may have a connector at one end such as connector 256. Connector 256 may mate with connector 254 to support optical and electrical communications. In device 14, the wires and optical path in cable 70 may be hardwired to electrical and optical interface circuitry without using a connector (shown as hardwired connection 264 in FIG. 7). Device 14 in FIG. 7 may have connectors such as optical-electrical connector 262 to interface with additional equipment (e.g., as described in connection with FIG. 5).

Figure 8:
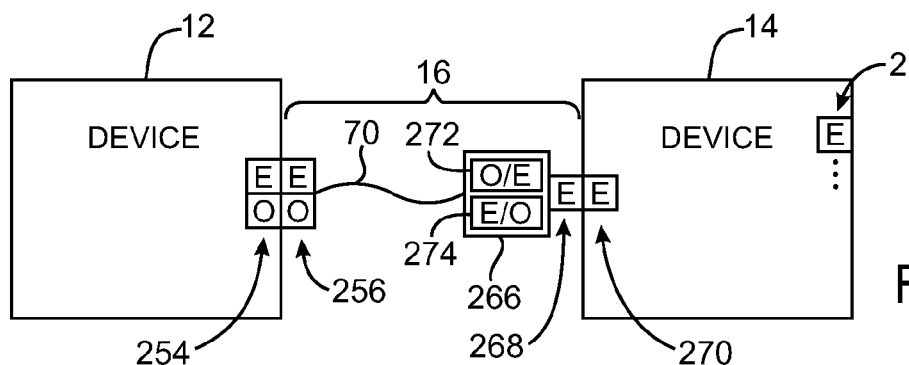
FIG. 8 is a circuit diagram showing how an electronic device may communicate with external equipment using a cable that contains optical-to-electrical and electrical-to-optical interface circuitry in accordance with an embodiment of the present invention.

Cable 70 may contain optical-electrical interface circuitry. An arrangement of this type is shown in FIG. 8. As shown in the FIG. 8 example, cable 70 may contain interface circuitry 266. At one end, cable 70 may have an optical-electrical connector (connector 256) that mates with optical-electrical connector 254 of device 12. Optical-electrical connector 256 may have an optical path formed from a fiber and/or other optical coupling structure and electrical contacts. The optical path and electrical contacts of connector 256 may mate with a corresponding optical path and electrical contacts in connector 254 of device 12. At its other end, cable 70 may have an electrical connector (connector 268) having electrical contacts that mate with electrical contacts in corresponding electrical connector 270 of device 14. An electrical path may be formed directly between the electrical contacts of connector 256 and connector 268 and/or wires in the electrical path that originate at the electrical contacts of connector 256 may terminate at electrical terminals associated with interface circuitry 266. When electrical signals from connector 256 are received by interface circuitry 266, interface circuitry 266 may retransmit these electrical signals on some or all of the electrical contacts in connector 268 and vice versa.

Device 14 of FIG. 8 may have other ports (e.g., ports formed by electrical connectors 276) to support connections with additional equipment. Interface circuitry 266 may contain optical-to-electrical converter circuitry 272 and electrical-to-optical converter circuitry 274. Circuits 272 and 274 may include optical transceiver circuitry to send and receive optical signals and electrical transceiver circuitry to send and receive electrical signals. For example, optical-to-electrical converter circuitry 272 may include a photodetector. Electrical-to-optical converter circuitry 274 may include a light source. During operation, device 14 may use a light source to transmit optical signals through the optical path in connectors 254, 256, and cable 70. Circuitry 272 may receive the optical signals from the optical path in cable 70 that have been transmitted by device 12 and, using the photodetector, may produce corresponding electrical signals that are supplied to device 14 using electrical connector 268 and mating electrical connector 270. Circuitry 266 may receive electrical signals from device 14 via connector 270 and connector 268 and may use the light source of electrical-to-optical circuitry 274 to produce corresponding optical signals. These optical signals may be conveyed to device 12 using the optical path in cable 70.

In arrangements of the type shown in FIGS. 6, 7, and 8, the electrical-optical connectors and electrical connectors may be implemented as 3.5 mm TRS audio connectors or other audio connectors, may be implemented as XLR connectors, or may use other suitable form factors. The optical paths in cable 70 may be formed form a single optical fiber that is coupled to wavelength-division-multiplexing filters and corresponding sources and detectors. For example, a single fiber may be used in the arrangement of FIG. 8 to convey optical signals from connector 256 to optical-electrical interface circuitry 272. In interface 266, a wavelength-division-multiplexing filter may be used to route light from the optical path of cable 70 that has a first wavelength to the photodetector in circuitry 272 and may be used to route light that has a second wavelength from the light source in circuitry 274 to the optical path of cable 70.

Figure 9:
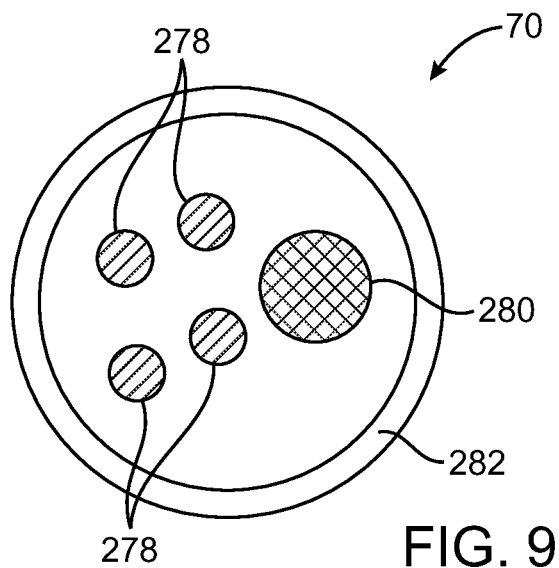
FIG. 9 is a cross-sectional diagram of an illustrative cable containing four wires and an optical fiber in accordance with an embodiment of the present invention.

A cross-sectional side view of an illustrative cable such as cable 70 is shown in FIG. 9. In the example of FIG. 9, cable 70 has four wires 278 and a single optical fiber (fiber 280). Wires 278 and fiber 280 may be encased in jacket 282. Additional components may be included in cable 70 if desired (e.g., strands of strengthening fiber, dielectric filler, metal braids or foils (e.g., for electromagnetic shielding), etc. Wires 278 may be formed from a solid conductor (e.g., solid copper wire) or from stranded wire. A plastic coating or other insulator may surround each wire to prevent short circuits. Fiber 280 may be formed from a material that is transparent to light (e.g., to infrared or visible light). Suitable materials for fiber 280 include plastic and glass. Fiber 280 may be a multimode fiber or may be a single mode fiber. One or more layers (e.g., a core layer, a cladding layer, strengthening layers, etc.) may be included in fiber 280.

Figure 10:
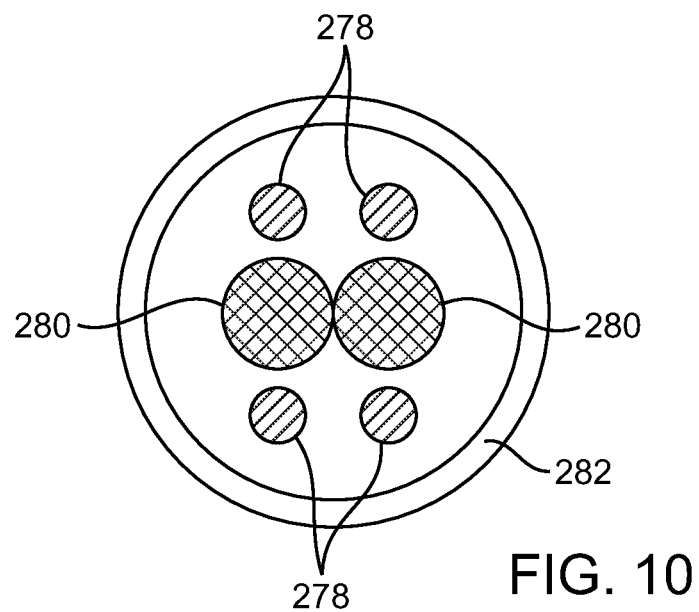
FIG. 10 is a cross-sectional diagram of an illustrative cable containing four wires and two optical fibers in accordance with an embodiment of the present invention.

Wires 278 may be used in forming an electrical path in path 16. Fiber 280 may be used in forming an optical path. Although four wires and a single optical fiber are shown in the illustrative cross-sectional view of FIG. 9, this is merely an example. Cable 70 may contain fewer than four wires or more than four wires and may contain one, two, or more than two optical fibers. For example, cable 70 may contain two optical fibers 280, as shown in FIG. 10.

When path 16 contains a single optical fiber, optical signals may be sent in one direction. For example, a transmitter in device 12 may transmit optical signals to a corresponding receiver in equipment 14 or a transmitter in equipment 14 may transmit optical signals to a corresponding receiver in device 12. Bidirectional communications may also be supported. With one suitable arrangement, a time division multiplexing scheme may be used to support bidirectional communications. In a time division multiplexing scheme, device 12 and equipment 14 may take turns in using the optical path. During certain time periods, device 12 can transmit optical signals to equipment 14. During other time periods, equipment 14 can transmit optical signals to equipment 12.

Simultaneous bidirectional communications over a single fiber may also be supported. For example, multiple wavelengths of light may be used in the system. Electronic device 12 may transmit upstream data using light at a first wavelength while equipment 14 is simultaneously transmitting downstream data using light at a second wavelength. When cables contain multiple fibers (as with the illustrative cable of FIG. 10), one fiber may be used for upstream communications while the other fiber is being used for downstream communications. Each fiber in a multi-fiber cable may also be used for bidirectional communications using time-division or wavelength-division multiplexing techniques.

In cable 70, the optical fiber that makes up the optical path may be located in the center of the cable (i.e., running along its longitudinal axis in a coaxial fashion) or may be located in other suitable portions of the cable (e.g., near the plastic jacket or intertwined with other strands of material). In the optical-electrical connectors, the optical fiber can be coupled to transparent structures that help guide light to and from the optical fiber. These transparent structures may include coaxial lengths of fiber, annular (ring-shaped) transparent insulators (e.g., insulators that serve both as transparent conduits for light and as electrical insulators that isolate electrical contacts in the connectors from each other), etc.

Figure 11:
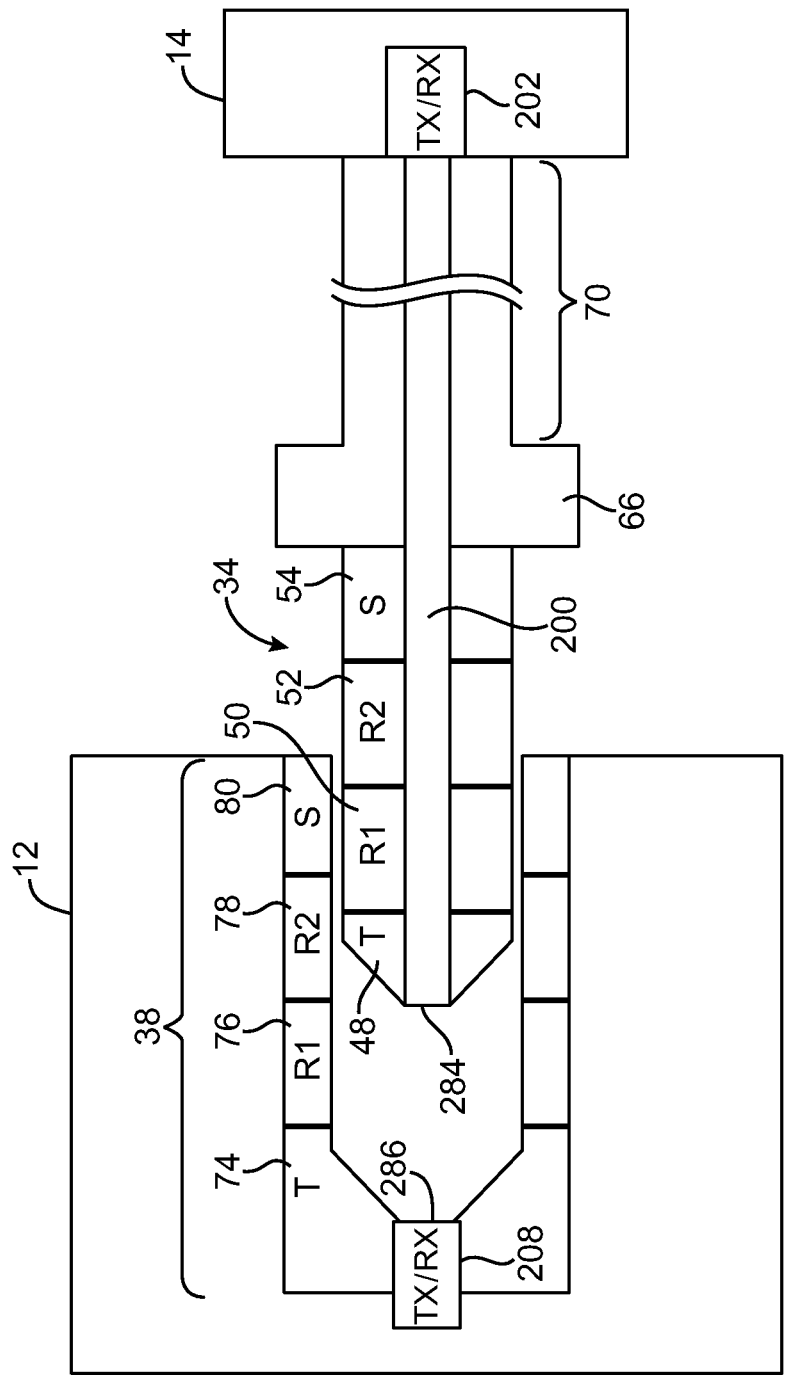
FIG. 11 is a cross-sectional diagram of an illustrative jack and plug that are coupled to a cable having an optical fiber and wires in accordance with an embodiment of the present invention.

An illustrative configuration that may be used for an optical-electrical audio plug and a mating optical-electrical audio jack is shown in FIG. 11. As shown in FIG. 11, audio connector 38 (e.g., a TRS audio jack) may contain electrical contacts 74, 76, 78, and 80 (labeled T, R1, R2, and S, respectively) and may have an associated optical transceiver 208. The diagram of FIG. 11 shows plug 34 partially inserted into jack 38. When plug 34 is fully plugged into jack 38, electrical contacts 48, 50, 52, and 54 (labeled T, R1, R2, and S, respectively) form respective electrical connections with mating contacts 74, 76, 78, and 80. Optical path 200 may be placed in contact with transceiver 208 or may be placed sufficiently close to transceiver 208 that optical signals (light) may be coupled between transceiver 208 and path 200. If desired, jack 38 may include an optical member such as member 206 of FIG. 2 that is interposed in optical path 200 to help convey optical signals between input-output port 286 of transceiver 208 and tip 284 of optical path 200. In this type of configuration, the optical member (which may be, for example, a short length of optical fiber) may serve as an extending portion of path 200.

Figure 12:
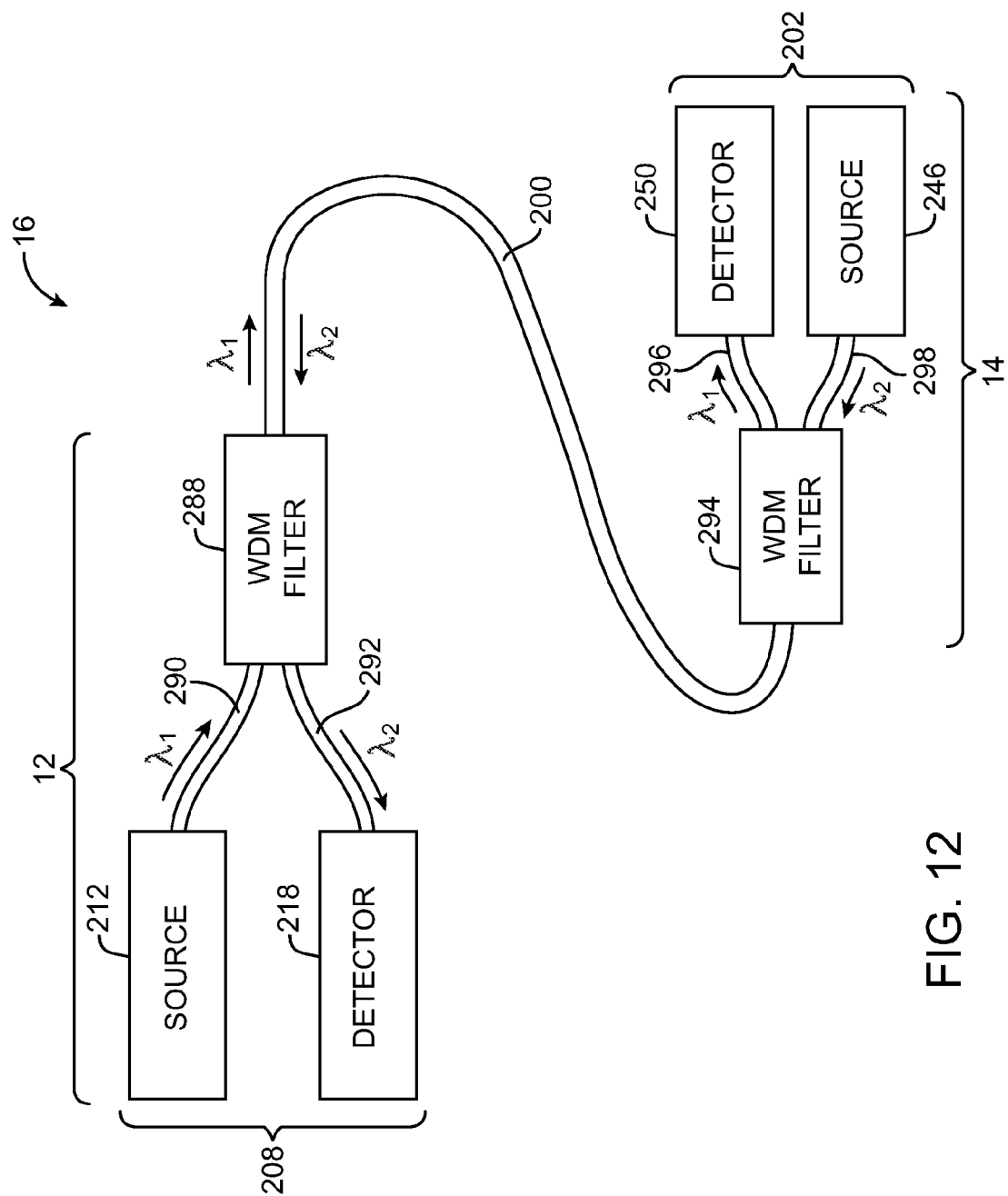
FIG. 12 is a diagram of an optical path coupled to a pair of optical transceivers in accordance with an embodiment of the present invention.

In configurations of the type shown in FIG. 11, there may be only a single optical fiber in cable 70 and in connector 34. It may therefore be desirable to use wavelength-division multiplexing techniques to support bidirectional communications over the optical fiber. Wavelength division multiplexing may be implemented using wavelength division multiplexing (WDM) optical filters. As shown in FIG. 12, for example, a respective WDM filter may be coupled to each end of path 16. In device 12, source 212 may be coupled to an input port of WDM filter 288 by optical path 290 (e.g., an optical fiber). Detector 218 may be coupled to an output port of WDM filter 288 by optical path 292 (e.g., an optical fiber). Path 200 (e.g., an optical fiber) may be coupled to an input-output port of WDM filter 288 (either by direct connection or via an optical path extension such as optical path extension 206 of FIG. 2). In device 14, WDM filter 294 may have an input-output port that is coupled to path 200, an output port that is coupled to detector 250 (e.g., by optical path 296), and an input port that is coupled to source 246 (e.g., by optical path 298).

WDM filters 294 and 288 combine and separate light by wavelength. For example, outgoing light from source 212 at a first wavelength may be routed to path 200 by WDM filter 288. In device 14, WDM filter 294 may route light at this first wavelength to the input of detector 250. Source 246 in device 14 may transmit light at a second wavelength that is different than the first wavelength. WDM filter 294 may route this second wavelength of light onto path 200. In device 12, WDM filter 288 may route light at the second wavelength to the input of detector 218. WDM filters 288 and 294 may be implemented using gratings, coupled waveguides, etc. If more than two wavelengths are desired in a wavelength division multiplexing scheme, additional WDM filters or filters with additional ports may be used to accommodate additional sources and detectors. WDM filter configurations of the type shown in FIG. 12 may, if desired, be used in systems of the type described in connection with FIGS. 6, 7, and 8 (as an example).

In arrangements of the type shown in FIG. 11, optical path 200 may be formed using a coaxial fiber (i.e., a fiber that runs along the central longitudinal axis of cable 70 and connectors 34 and 38). Audio connectors 34 and 38 in this type of arrangement need not be placed in a particular rotational orientation to ensure adequate optical coupling between path 200 and transceiver 208, because connectors 34 and 38 in the FIG. 11 arrangement are radially symmetric.

Figure 13:
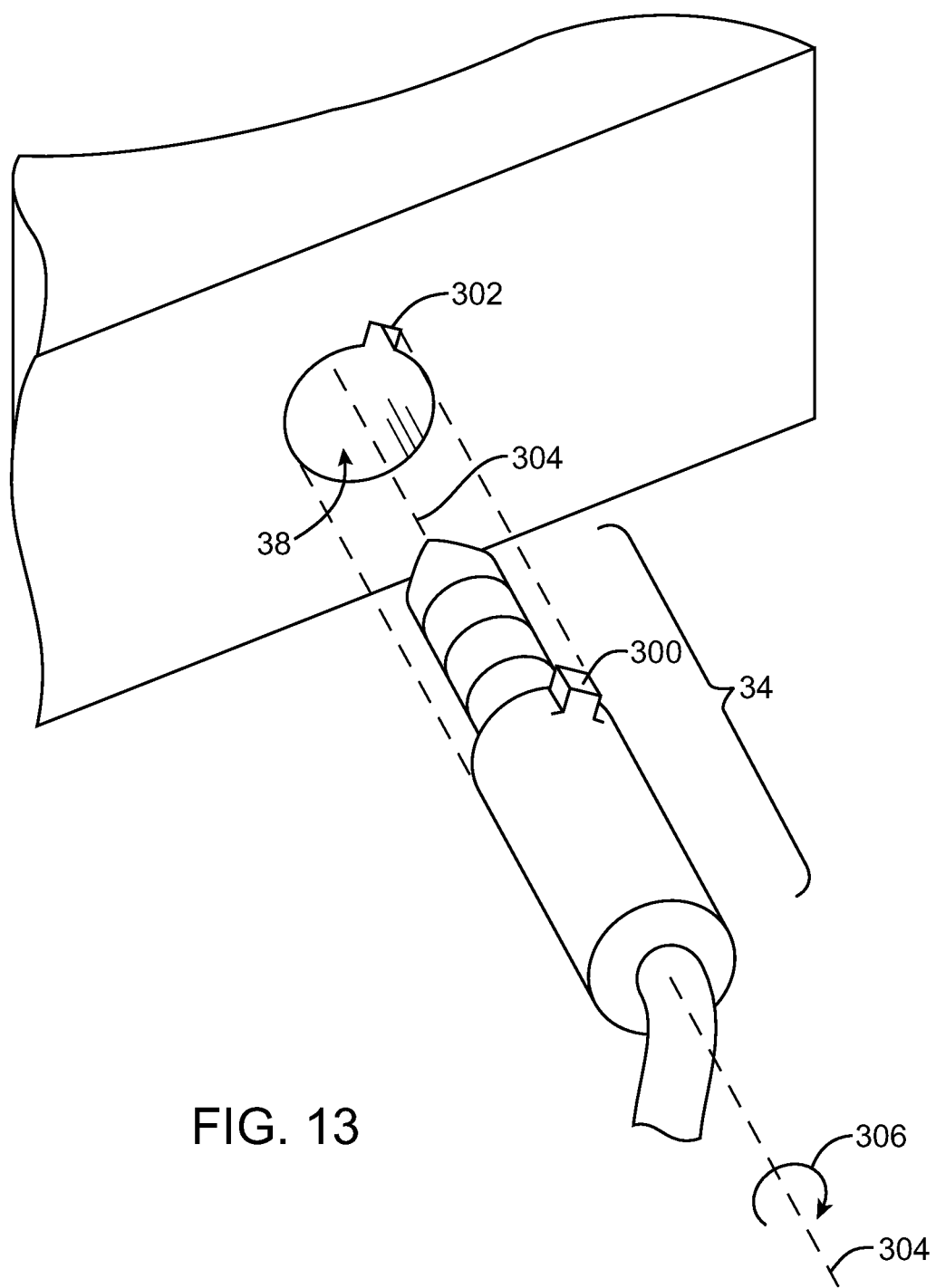
FIG. 13 is a perspective view of an illustrative pair of audio connectors that have mating engagement features in accordance with an embodiment of the present invention.

If desired, however, connectors 34 and 38 may be provided with alignment features that help these connectors maintain a particular desired rotational orientation when mated. This type of arrangement is shown in FIG. 13. As shown in FIG. 13, plug 34 and jack 38 may be aligned along longitudinal axis 304. Plug 34 may have one or more engagement features such as engagement feature 300 (e.g., a protrusion). Jack 38 may have one or more mating engagement features such as engagement feature 302 (e.g., an indentation or other recess). When a user desires to insert plug 34 into jack 38 along axis 304, the user may rotate plug 34 about axis 304 in direction 306. Once the engagement features are properly aligned (i.e., once features 300 and 302 are in rotational alignment), plug 34 may be completely inserted into jack 38.

Figure 14:
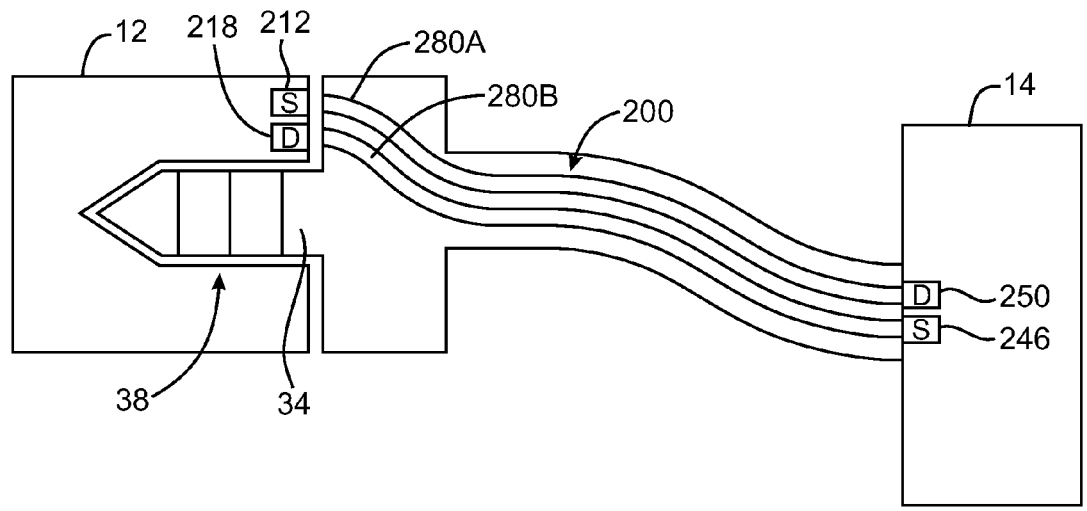
FIG. 14 is a cross-sectional diagram of an illustrative plug and mating jack of the type shown in FIG. 13 showing how an optical source and optical detector may be coupled to respective optical fibers in a cable in accordance with an embodiment of the present invention.

When rotational alignment features of the type show in FIG. 13 are used in the audio connectors, a desired rotational alignment between plug 34 and jack 38 may be ensured. As a result, source 212 and detector 218 may be located at particular known positions in device 12, as shown in FIG. 14. In the FIG. 14 example, path 200 includes first fiber 280A and a second fiber 280B. In device 14, fiber 280A is coupled to detector 250 and fiber 280B is coupled to source 246. When plug 34 is connected to jack 38, alignment features 300 and 302 (FIG. 13) engage and thereby ensure that fiber 280A will be properly aligned with source 212 and that fiber 280B will be properly aligned with detector 218 (or, in configurations that use WDM filters, that the single fiber in path 200 is aligned with the input-output port of the WDM filter).

Figure 15:
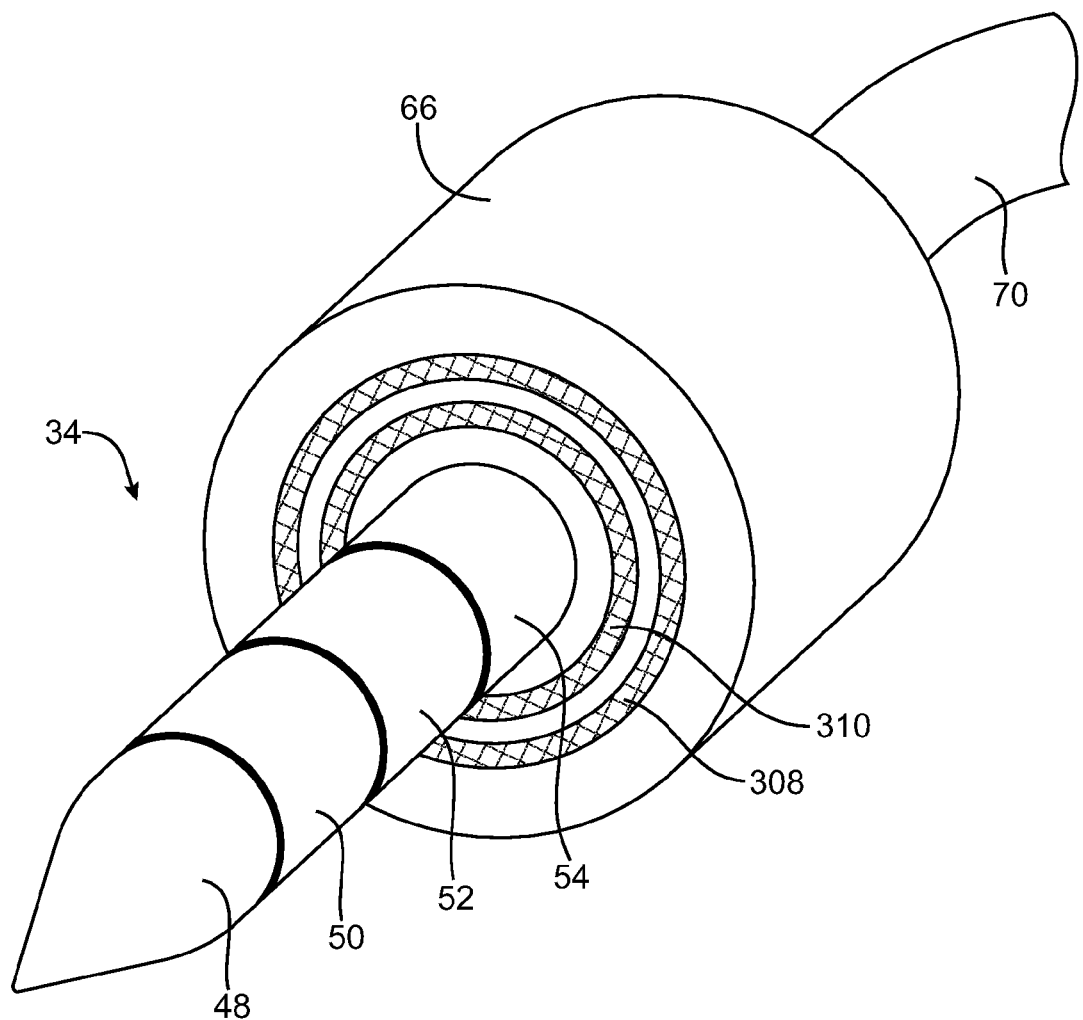
FIG. 15 is a perspective view of an illustrative plug having annular transparent portions through which light may be conveyed to optical fiber structures in an attached cable in accordance with an embodiment of the present invention.

In systems that do not use alignment features, it may be desirable to provide plug 34 and jack 38 with radially-symmetric optical coupling structures. Consider, as an example, the plug configuration of FIG. 15. As shown in FIG. 15, plug 34 may be provided with annular optical structure 310 and concentric annular optical structure 308. Structures 310 and 308 may be ring-shaped transparent members that are optically coupled to respective optical fibers in cable 70 and that surround the prong (elongated prong-shaped member 309) on which the tip contact, ring contacts, and sleeve contact of the plug are formed. Structures 310 and 308 may be formed from clear plastic, glass, or other suitable transparent substances (e.g., for infrared or visible light). The example of FIG. 15 includes two annular optical coupling structures, but arrangements with only a single optical coupling structure may be used if desired (e.g., when a WDM arrangement of the type described in connection with FIG. 12 is used).

Figure 16:
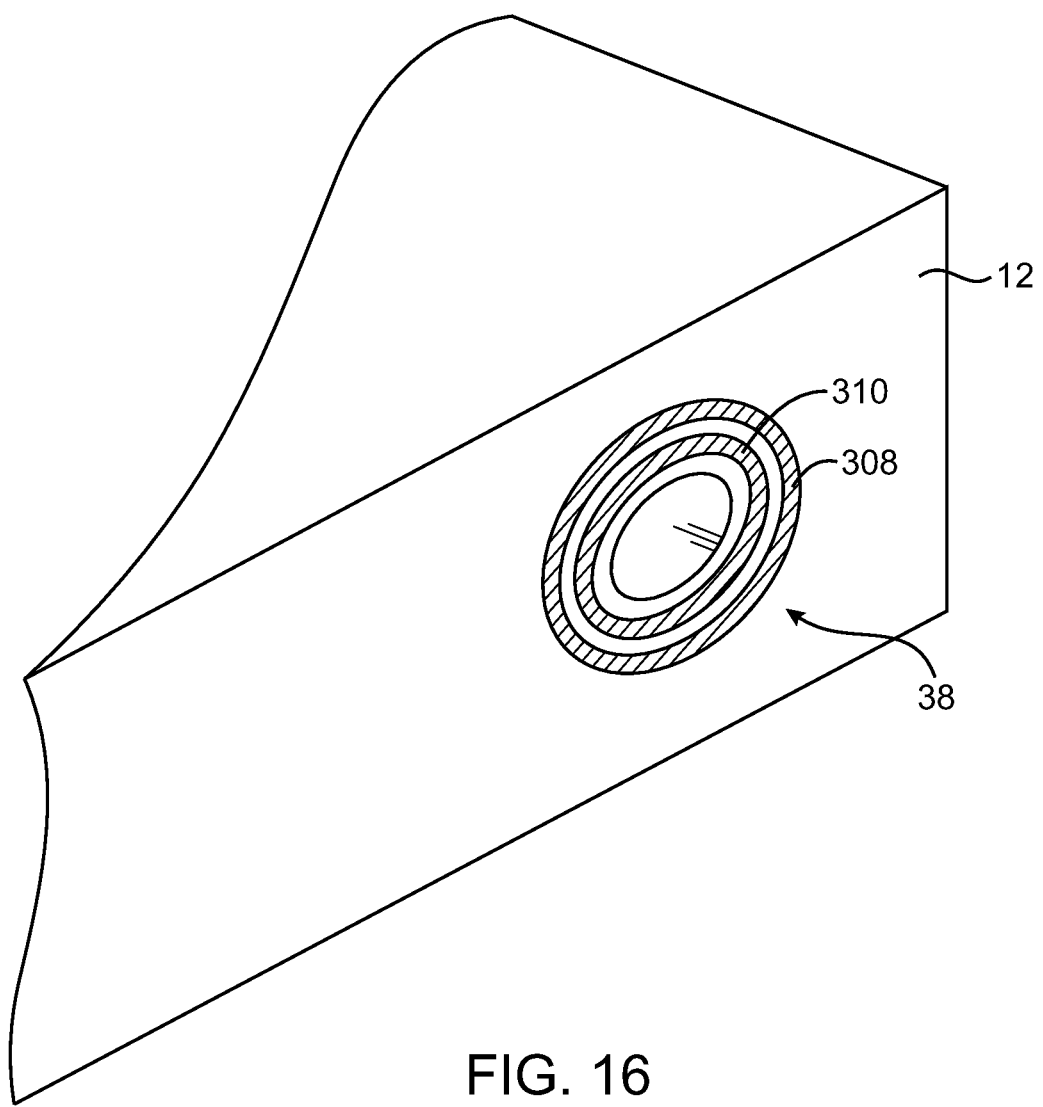
FIG. 16 is a perspective view of a portion of an electronic device containing a jack and associated annular source and detector regions that may mate with the annular transparent jack regions in a jack of the type shown in FIG. 15 in accordance with an embodiment of the present invention.

Because optical coupling structures such as optical coupling structures 310 and 308 are radially symmetric, use of arrangements of the type shown in FIG. 15 help ensure that there is adequate optical coupling between the audio connectors (e.g., optical coupling between optical path 200 and transceiver 208) regardless of the rotational orientation between plug 34 and jack 38. If desired, one or more annular optical coupling structures may be included in jack 38, as shown in FIG. 16. In this type of arrangement, coupling structure 308 has a diameter that is greater than the diameter of the circular opening of the cylindrical cavity that forms the interior portion of jack 38 and coupling structure 310 has a diameter greater than that of coupling structure 308. Coupling structure 308 may be used to route incoming light from optical coupling structure 308 of plug 34 to a detector in device 14. Coupling structure 310 of jack 38 may be used to route transmitted light from the source in device 12 to optical coupling structure 310 in plug 34 (FIG. 15). The ring-shaped optical coupling structures in jack 38 and plug 34 may be used to mate with each other or may be used to mate with sources, detectors, or optical fibers that have fixed positions within their connectors, but that do not completely surround the connector. For example, annular optical coupling structures in plug 34 may be coupled with a source and detector of the type shown in FIG. 14 or annular optical coupling structures in jack 38 may be coupled with optical fibers such as optical fibers 280A and 280B in plug 34.

Figure 17:
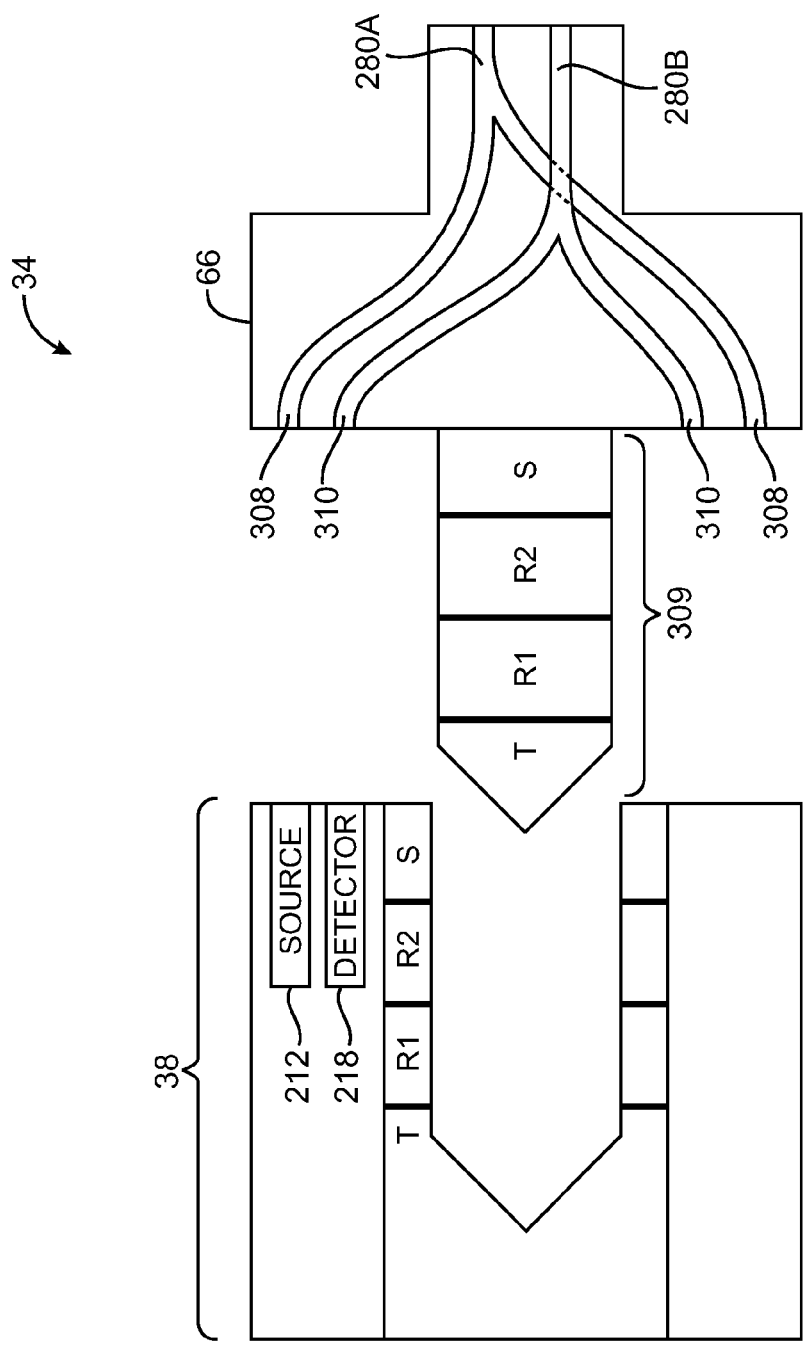
FIG. 17 is a cross-sectional side view of a system based on a plug of the type shown in FIG. 15 and jack of the type shown in FIG. 16 in accordance with an embodiment of the present invention.

A cross-sectional side view of a plug and jack where the ring-shaped optical coupling structures of plug 34 are used to mate with a source and detector in jack 38 is shown in FIG. 17. As shown in FIG. 17, outer annular optical coupling structure 308 may be coupled to optical fiber 280A and inner annular optical coupling structure 310 may be coupled to optical fiber 280B. Annular optical coupling structure 308 will optically couple fiber 280A to source 212, regardless of the rotational orientation of plug 34 within jack 38. Similarly, optical coupling structure 310 will optically couple fiber 280B to detector 218, regardless of the rotational orientation between plug 34 and jack 38.

If desired, light can be transmitted through transparent optical coupling structures that are formed between the electrical contacts in plug 34 and jack 38. Each of the electrical contacts in plug 34 and jack 38 (i.e., the tip, ring, and sleeve contacts) may be electrically insulated from adjacent electrical contacts using ring-shaped transparent dielectric structures (e.g., glass, plastic, or other dielectric materials that are transparent in the infrared or visible portions of the spectrum and that are electrically insulating). These structures can therefore serve dual purposes. Electrically, the dielectric structures are insulators that block the flow of current between adjacent electrical connectors. This prevents the electrical contacts from becoming shorted to each other. Optically, at least some of the dielectric structures are transparent to the optical signals on path 200. This allows the optical signals to be coupled between the optical transceiver and optical path 200.

Figure 18:
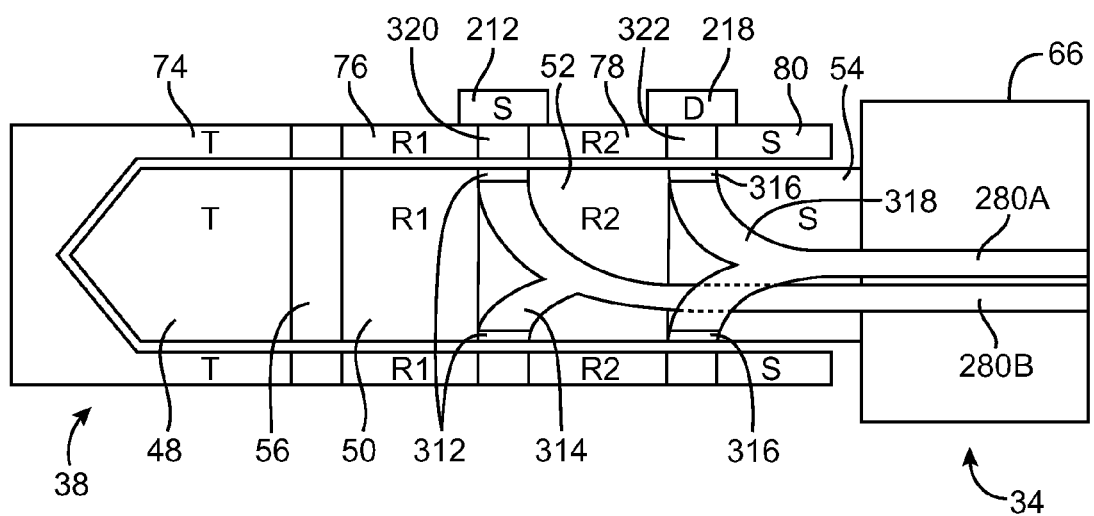
FIG. 18 is a cross-sectional side view of an illustrative plug-and-jack system in which the plug has transparent ring-shaped insulators and the jack has matching source and detectors in accordance with an embodiment of the present invention.

A connector arrangement in which transparent dielectric structures are formed between respective electrical contacts in plug 34 and jack 38 is shown in FIG. 18. As shown in FIG. 18, plug 34 may have contacts 48, 50, 52, and 54 that mate with respective contacts 74, 76, 78, and 80 in jack 38. Contacts 48, 50, 52, and 54 of FIG. 18 are ring shaped. Mating contacts 74, 76, 78, and 80 may be formed using hollow rings, spring metal tabs that protrude inwards and make electrical contact with the contacts of plug 34, or other suitable electrical contacts. In a typical configuration, the contacts of plug 34 are separated by dielectric (see, e.g., dielectric band 56, which isolates tip contact 48 from ring contact 50).

At least some of the dielectric that isolates the electrical contacts in plug 34 may also serve as transparent windows for optical signals. In the FIG. 18 example, ring-shaped optical band 312 may be formed from a dielectric such as transparent plastic or transparent glass. Optical coupling structure 314 (e.g., one or more transparent plastic or glass members) may be used to optically couple optical band structure 312 to optical path 280B. Optical structures 312 and 314 are interposed between contacts 50 and 52 and therefore may help to isolate contacts 50 and 52 from each other. Ring-shaped optical band 316 may also be formed from a dielectric such as transparent plastic or transparent glass. Optical coupling structure 318 (e.g., one or more transparent plastic or glass members) may be used to optically couple optical band structure 316 to optical path 280A. When plug 34 is inserted into jack 38 as shown in FIG. 18, structures 312 and 314 may optically couple source 212 to path 280B and structures 316 and 318 may optically couple detector 218 to path 280A.

With an arrangement of this type, path 280B may be used by jack 38 to transmit optical signals from device 12 and path 280A may be used by jack 38 to receive optical signals for device 12. Other arrangements may be used if desired. For example, jack 38 and plug 34 may be provided with a single optical path rather than multiple optical paths. In this type of arrangement, bidirectional communications may be supported using wavelength-division-multiplexing techniques as described in connection with FIG. 12 or time-division multiplexing techniques. Moreover, any respective pair of the contacts may be separated by a transparent insulator structure. The separation of the R1 and R2 contacts by one such structure and the separation of the R2 and S contacts by another such structure in the example of FIG. 18 are merely illustrative. If desired, the transparent insulator structures may be formed as unitary pieces of material. The use of two or more separate pieces of adjacent transparent material (e.g., the two-piece structures such as structure 312/314 and structure 316/318 of FIG. 18) is shown as an example.

As shown in FIG. 18, jack 18 may also have transparent insulating structures such as structure 320 and 322 in the gaps between adjacent contacts. These structures may, if desired, help isolate the electrical contacts in jack 38 from each other. Structure 320 may have a fiber shape, a ring shape, or other suitable shape and may be used to guide light from source 212 into structure 312. Structure 322 may have a fiber shape, a ring shape, or other suitable shape and may be used to guide light from structure 316 into detector 218. In wavelength-division-multiplexing arrangements, only one of transparent insulator optical coupling structures 320 and 322 need be used. In this type of situation, the optical coupling structure may be coupled to a WDM filter such as filter 288 of FIG. 12.

Source 212 and detector 218 (or, in WDM configurations, WDM filter 288) may be located at a particular rotational orientation around plug 34 (as shown in the FIG. 18 example) or may be formed at one or more radial locations around plug 34. In configurations in which only one radial location is used (e.g., the 12:00 position of source 212 and detector 218 that is shown in the FIG. 18 example), structures 320 and 322 may be used to help concentrate and guide light between that radial location and the radially uniform ring-shaped structures in plug 34 such as structure 312 and 316 or other transparent insulator plug structures.

If desired, engagement features such as features 302 and 300 of FIG. 13 may be used in connection with connectors of the type shown in FIG. 18. When engagement features are used, the rotational orientation between plug 34 and jack 38 is known whenever plug 34 and jack 38 are coupled together. As a result, optical coupling structures 314 and 318 may be configured to guide light to and from a particular radial location around plug 34 (e.g., at the 12:00 location of the source and detector of FIG. 18). In this way, the signal strength reductions that might otherwise be associated with spreading out optical signals in a radially uniform fashion can be avoided.

Figure 19:
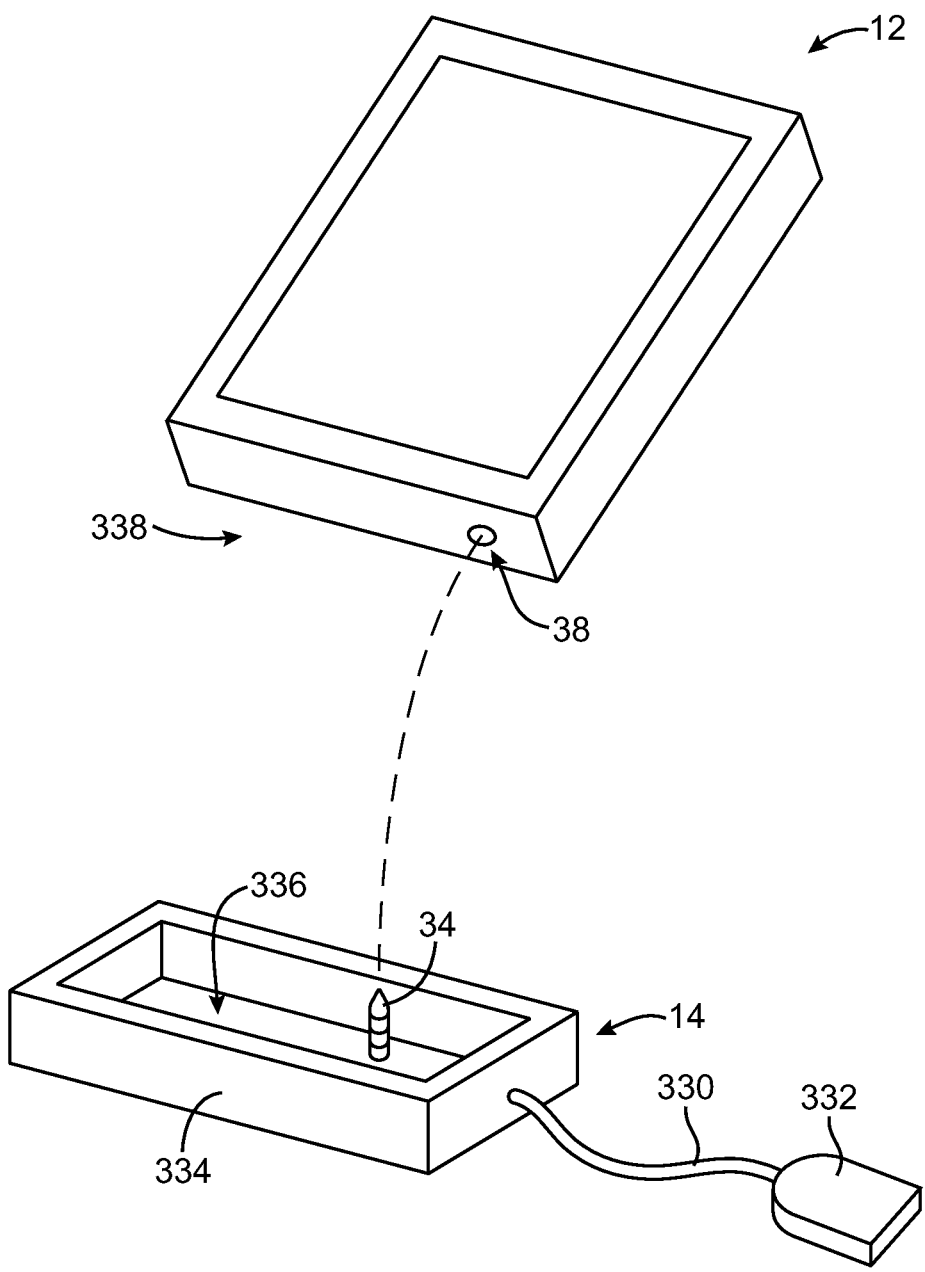
FIG. 19 is a perspective view of an illustrative electronic device and an associated accessory that has a vertically mounted protruding hybrid plug that is received by a hybrid jack in the electronic device in accordance with an embodiment of the present invention.

FIG. 19 is a perspective view of an illustrative electronic device and an associated accessory. As shown in FIG. 19, accessory 14 may have a base 334 from which plug 34 protrudes vertically. Base 334 may serve as a stand that supports an electronic device. Base structure 334 may have a cavity 336. Cavity 336 may have a size and shape that is configured to receive and support end 338 of device 12. Cable 330 and connector 332 may be attached to additional equipment such as a computer (see, e.g., computing equipment 20 of FIG. 1). Cable 330 and connector 332 may be used to convey analog signals, power signals, and digital data signals. When a user desires to charge a battery in device 12 or to play audio and video from device 12, the user may insert device 12 into cavity 336. In this position, cylindrical plug 34 is received in mating cylindrical jack 38. Optical and electrical paths through plug 34 and jack 38 may be used to convey data and power between accessory 14 and device 12 (e.g., bidirectionally using time-division multiplexing and/or wavelength division multiplexing techniques). If desired, the electrical contacts of the connectors can distribute power to device 12 while device 12 is conveying digital optical signals to accessory 14 using an optical path through the connectors. Accessory 14 can be provided with speakers or other components that allow accessory 14 to present media to the user. Accessory 14 can also use optical transceiver circuitry and/or electrical transceiver circuitry to relay data to and from the equipment that is attached to cable 330 and connector 332.

Figure 20:
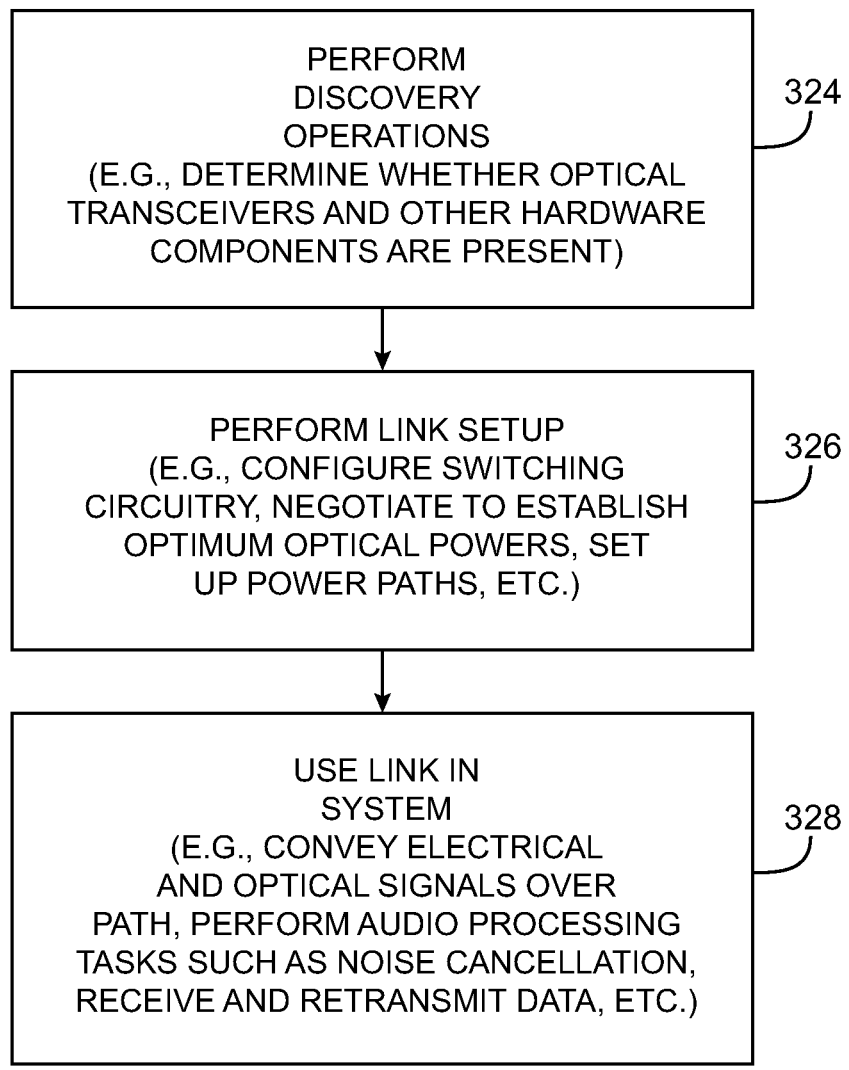
FIG. 20 is a flow chart of illustrative steps involved in configuring and using electrical equipment that has optical and electrical connectors in accordance with an embodiment of the present invention.

FIG. 20 is a flow chart showing illustrative steps involved in conveying electrical and optical signals through communications paths 16 between electrical equipment such as electronic device, accessories, and other equipment. The communications paths typically include both electrical and optical paths.

At step 324, after a user has connected equipment together using paths 16, the equipment in the system can perform discovery operations. These operations allow the components in the system to determine what other equipment is included in the system and therefore allow components to adjust their settings accordingly. As an example, an electronic device that discovers that a legacy headset that only includes electrical wires has been attached may configure itself to support analog audio playback, whereas an electronic device that discovers that an accessory with optical communications capabilities has been attached may configure itself to use its optical transceiver.

One way in which the equipment in system 10 may determine the capabilities of other equipment in the system involves the use of switches. For example, jack 38 may be provided with a mechanically-triggered, electrically-triggered, or optically-triggered switch (e.g., a light sensor such as a light reflection sensor) that changes state whenever an engagement feature such as engagement feature 300 is inserted a mating engagement feature such as engagement feature 302 (FIG. 13). The present of the engagement feature on the audio connector serves as a flag that advertizes its capabilities.

Another way in which equipment in system 10 may determine the capabilities of other equipment involves the use of communications protocols. Equipment in the system may, for example, broadcast codes that inform other equipment of their capabilities. An electric device or other accessory such as a headset may, for example, transmit optical or electrical information to make other equipment aware of its optical (and electrical) capabilities. Communications protocols may be unidirectional (e.g., equipment may broadcast codes without receiving significant information from other equipment) or may be bidirectional. In a typical bidirectional protocol, equipment in the system may, for example, transmit information that informs other equipment of their capabilities in response to received queries or may exchange capability information as part of a more complex two-way data exchange.

During discovery operations 324, equipment in system 10 may discover information on other equipment such as what type of communications protocols the equipment supports, what type of transceivers the equipment contains, whether the equipment contains an optical transceiver, etc.

At step 326, the equipment in the system may perform link setup operations. For example, the equipment in the system can exchange packets of digital data that inform the other equipment of desired clock rates, desired transmission powers for optical signals, desired communications formats (e.g., whether error correction capabilities will or will not be present, data rate limits, etc.), desired power supply voltages to be conveyed (if any), and other link settings.

As an example, consider a situation in which device 12 and equipment 14 each contain a light-emitting-diode (LED) source. Due to the quality of the optical coupling formed when plug 34 is inserted into jack 38 and other variables, the attenuation of optical path 200 may be uncertain. During the operations of step 326, device 12 and equipment 14 may send test light pulses while making corresponding power measurements with their detectors. Based on these measurements, device 12 and equipment 14 may then negotiate to establish optimal optical signal levels for use in communicating over path 16. Negotiations may take place using the electrical path and/or using the optical path. By negotiating optimal signal power levels, power consumption can be minimized, thereby enhancing efficiency.

A typical optical power negotiation process may initially involve transmission of a test packet from an accessory at an initial power P1 (e.g., a low or lowest power setting). In response, the electronic device may use its optical transceiver to measure the amount of power in the received optical signal. Once this power level has been measured, the electronic device can respond to the accessory. For example, the electronic device can respond to the accessory using the electrical transceiver in the electronic device. The response of the electronic device may indicate that the power P1 is an acceptable level for use in future optical communications over the link. If the measured power is low, the response of the electronic device may request that the accessory increase its optical transmission power. This negotiation process may continue until the two devices reach agreement on an acceptable optical power level to use for the link. Optical transmitters in both the electronic device and the accessory may be calibrated in this way.

After communications links between the equipment in system 10 have been established at step 326, the equipment may use these links during normal system operation (step 328). For example, the optical and electrical paths in links 16 may be used to convey video data (including audio soundtracks), audio data (e.g., for noise cancellation schemes), control signals, etc.

The foregoing is merely illustrative of the principles of this invention and various modifications can be made by those skilled in the art without departing from the scope and spirit of the invention.

What is claimed is:

1. An electronic device, comprising:
   storage and processing circuitry;
   a connector having a plurality of electrical contacts;
   a transparent insulator interposed between a pair of the electrical contacts;
   an electrical transceiver coupled to the electrical contacts; and
   an optical transceiver optically coupled to connector, wherein the optical transceiver comprises a light-emitting diode and a wavelength-division-multiplexing filter, wherein the optical transceiver is configured to transmit optical signals through the transparent insulator, wherein the connector comprises a tip-ring-sleeve connector, and wherein the electrical contacts include a tip contact, at least one ring contact, and a sleeve contact.

2. The electronic device defined in claim 1 wherein the connector comprises a jack, wherein the optical transceiver comprises a detector, wherein the wavelength-division-multiplexing filter has an input port that is optically coupled to the light-emitting diode, has an output port that is optically coupled to the detector, and has an input-output port that is optically coupled to the connector.

3. The electronic device defined in claim 1 wherein the light-emitting diode is coupled to the wavelength-division-multiplexing filter at a first port, wherein the optical transceiver comprises an optical detector coupled to the wavelength-division multiplexing filter at a second port, and wherein light at a first wavelength passes through the first port and light at a second wavelength that is different than the first wavelength passes through the second port.

4. The electronic device defined in claim 1 wherein the connector comprises an audio-video jack connector that is configured to receive an audio-video plug, and wherein the electrical contacts include a tip contact, at least one ring contact, and a sleeve contact.

5. A headset operable in analog audio mode and digital audio mode, comprising:
  a pair of speakers;
  processing circuitry that is coupled to the speakers;
  an electrical transceiver;
  an optical transceiver that is coupled to the processing circuitry and that includes a wavelength-division-multiplexing filter;
  switching circuitry configured switch the headset between the analog audio mode and the digital audio mode;
  a plug having a plurality of electrical contacts including a tip contact, at least one ring contact, and a sleeve contact; and
  a transparent insulator interposed between a pair of the electrical contacts, wherein the transparent insulator is configured to convey optical signals.

6. The headset defined in claim 5 wherein the optical transceiver comprises a light source coupled to the wavelength-division-multiplexing filter at a first port and comprises an optical detector coupled to the wavelength-division multiplexing filter at a second port and wherein light at a first wavelength passes through the first port and light at a second wavelength that is different than the first wavelength passes through the second port.

7. The headset defined in claim 6 further comprising:
  a cable having first and second ends, wherein the cable includes an optical path coupled to the optical transceiver at the first end and an electrical path coupled to the electrical transceiver at the first end.

8. The headset defined in claim 7 wherein the plug is connected to the second end of the cable, wherein the electrical contacts are coupled to the electrical path, and wherein the plug includes at least part of the optical path.

9. The headset defined in claim 8 further comprising an electrical interface coupled between the electrical contacts and the processing circuitry.

10. The headset defined in claim 9 further comprising a microphone coupled to the processing circuitry.

11. The headset defined in claim 8 wherein the plug comprises a 3.5 mm audio plug.

12. The headset defined in claim 6 wherein the light source comprises a light emitting diode.

13. The electronic device defined in claim 1 further comprising a power supply, wherein the power supply supplies power to at least one of the electrical contacts.

14. The electronic device defined in claim 13 further comprising switching circuitry that couples the electrical transceiver and the power supply to the plurality of electrical contacts.

15. The headset defined in claim 7 wherein the optical path is coupled to the transparent insulator and is configured to receive the optical signals through the transparent insulator.

16. The headset defined in claim 15 wherein the transparent insulator forms an external surface of the plug.

* * * * *